Aug. 18, 1942.   D. D. HUYETT   2,293,061
MACHINE FOR WRAPPING EXPLOSIVES
Filed Aug. 31, 1939   13 Sheets-Sheet 1

Inventor
Daniel D. Huyett
By Kenneth E. Mulford
Attorney

Aug. 18, 1942.    D. D. HUYETT    2,293,061
MACHINE FOR WRAPPING EXPLOSIVES
Filed Aug. 31, 1939    13 Sheets-Sheet 2

Inventor
Daniel D. Huyett

By Kenneth E. Mulford
Attorney

Aug. 18, 1942.    D. D. HUYETT    2,293,061
MACHINE FOR WRAPPING EXPLOSIVES
Filed Aug. 31, 1939    13 Sheets-Sheet 3

Inventor
Daniel D. Huyett
By Kenneth E. Mulford
Attorney

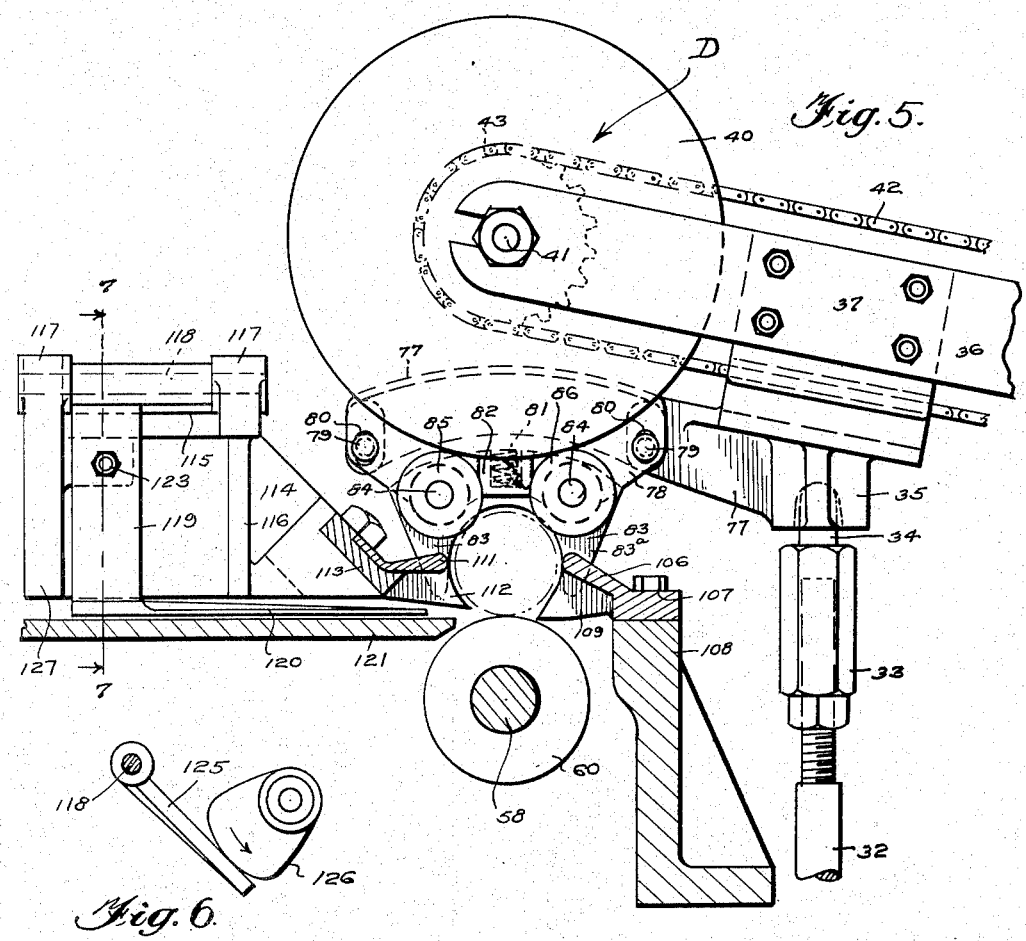
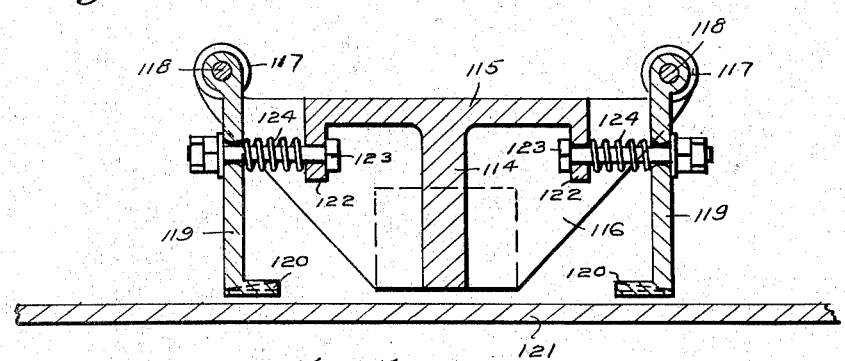

Aug. 18, 1942.  D. D. HUYETT  2,293,061
MACHINE FOR WRAPPING EXPLOSIVES
Filed Aug. 31, 1939  13 Sheets-Sheet 7
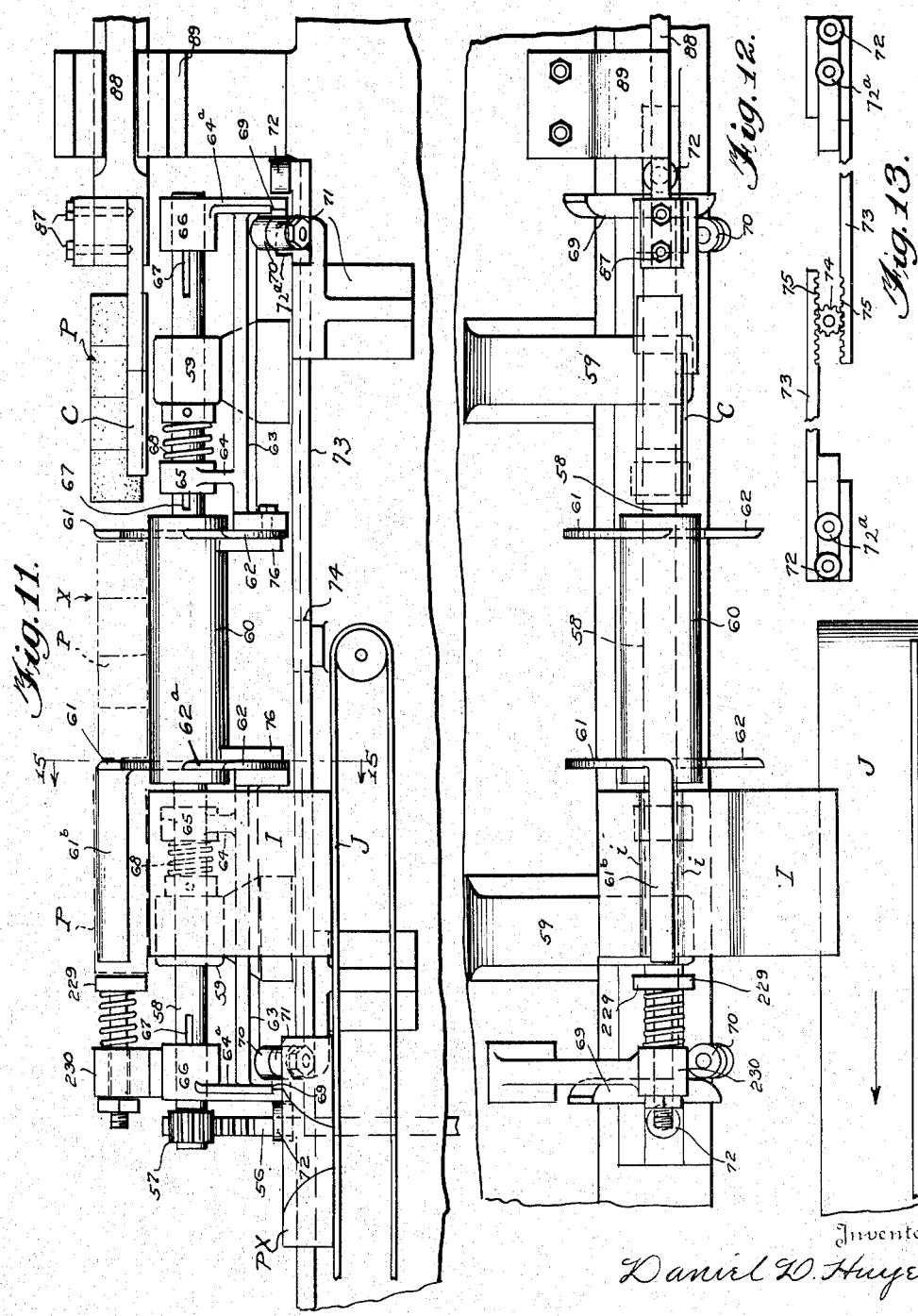
Inventor
Daniel D. Huyett
By Kenneth E. Mulford
Attorney

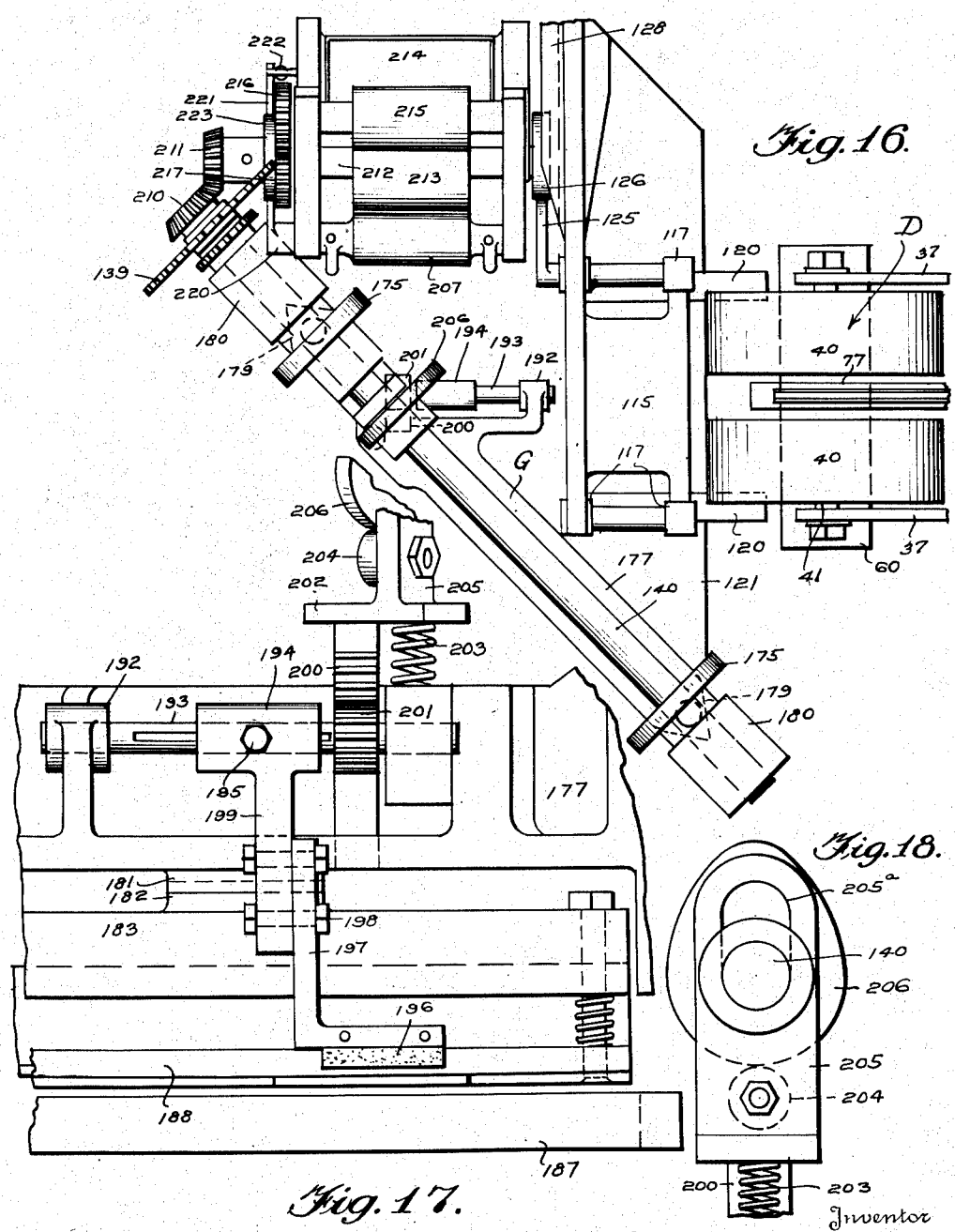

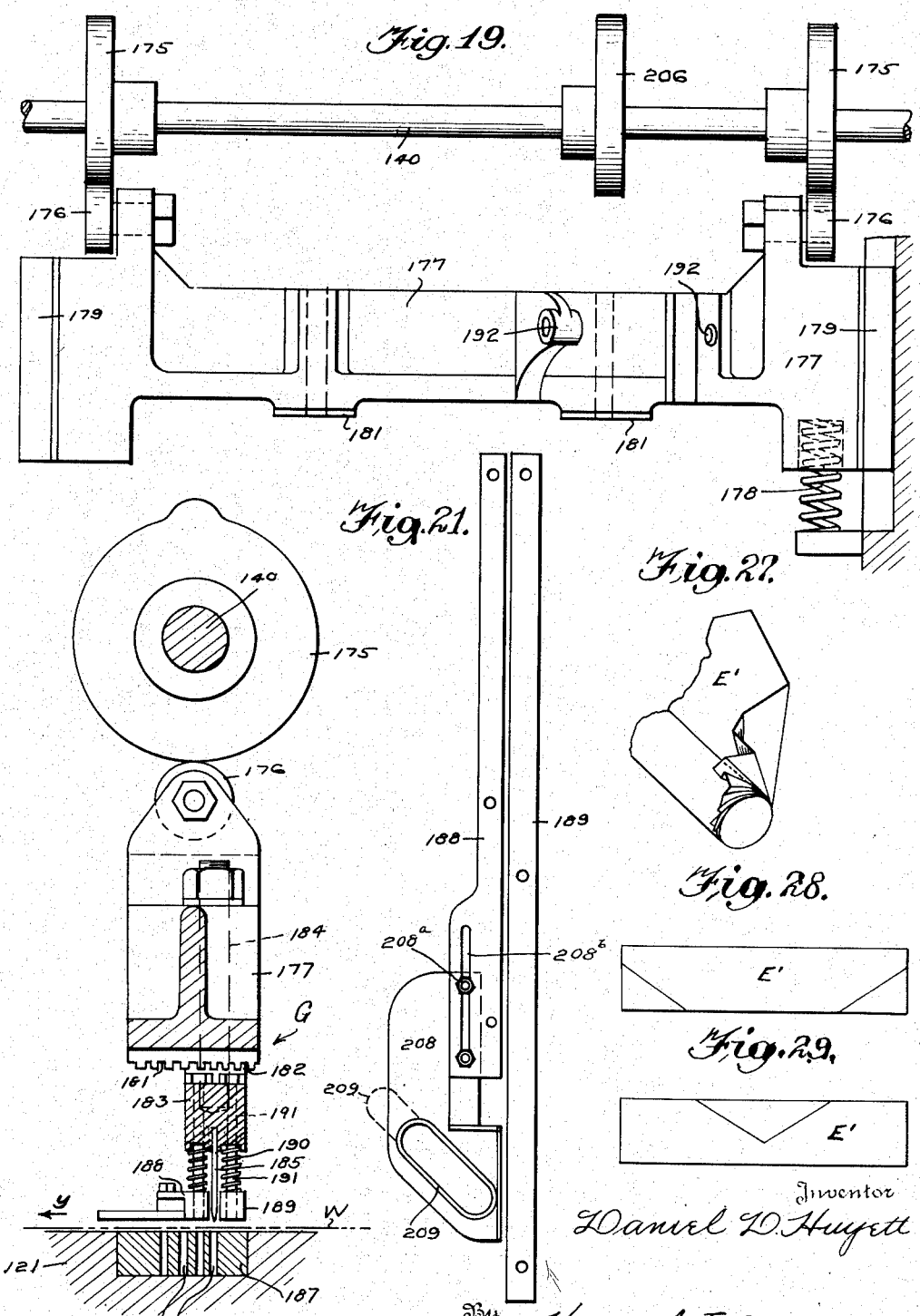

Aug. 18, 1942.   D. D. HUYETT   2,293,061
MACHINE FOR WRAPPING EXPLOSIVES
Filed Aug. 31, 1939   13 Sheets-Sheet 11

Inventor
Daniel D. Huyett
By Kenneth E. Mulford
Attorney

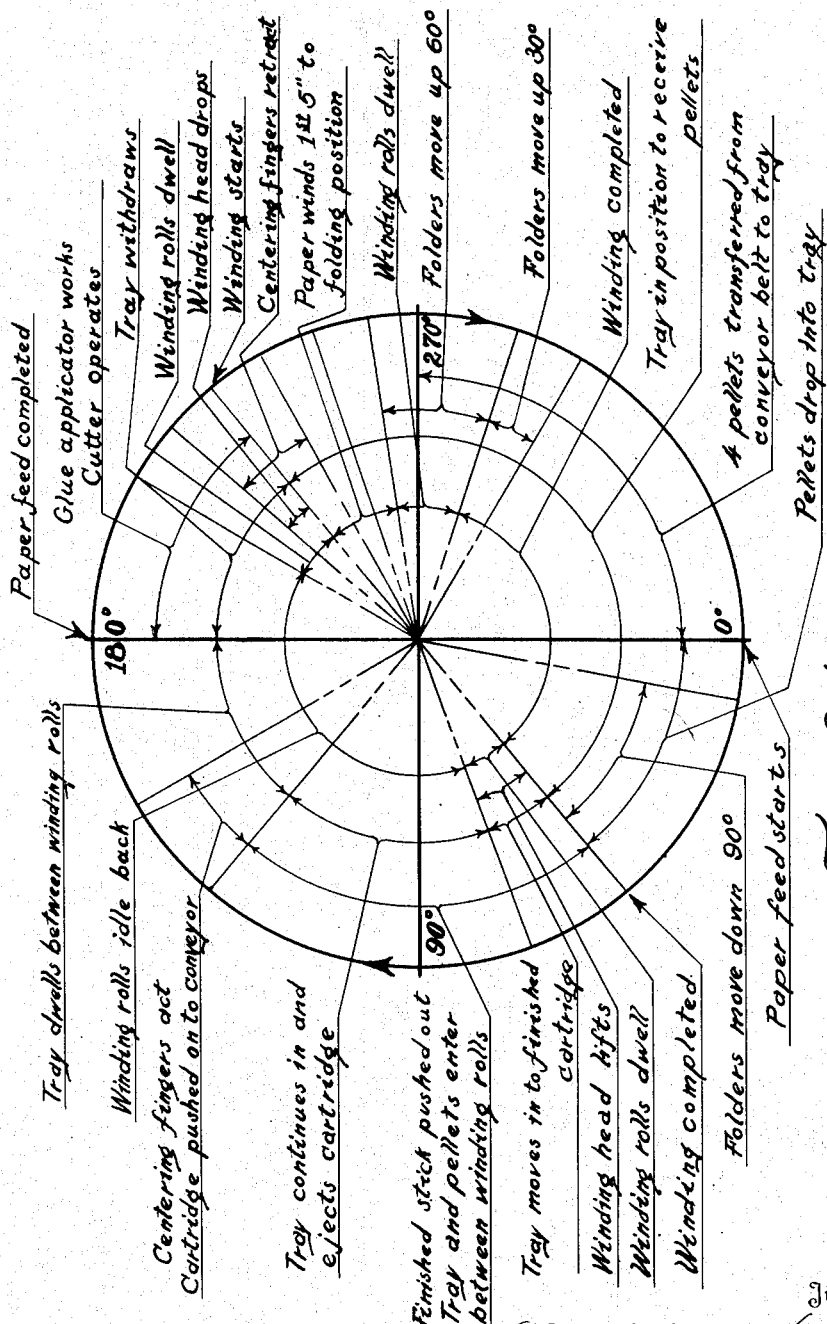

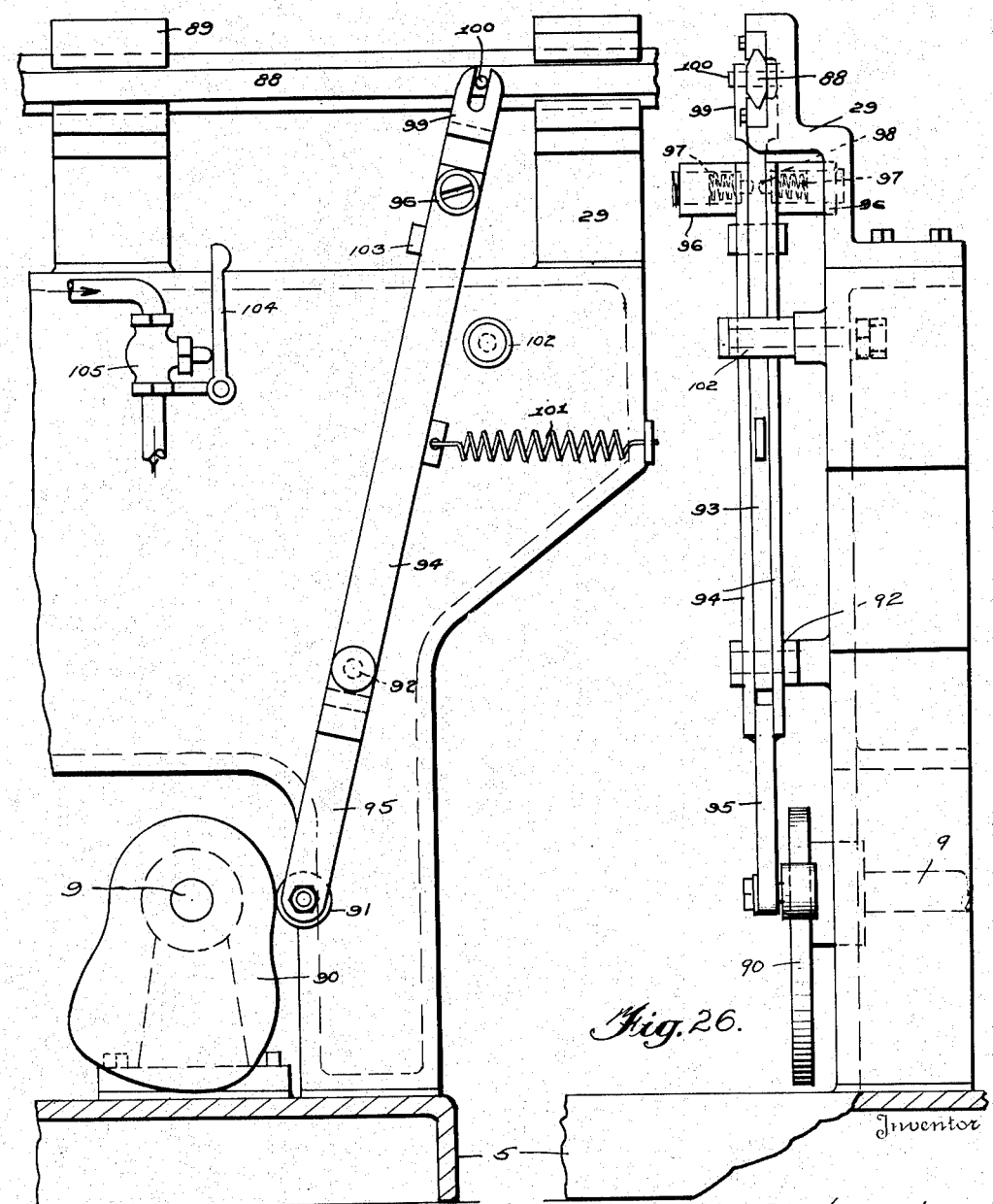

Patented Aug. 18, 1942

2,293,061

UNITED STATES PATENT OFFICE 2,293,061

MACHINE FOR WRAPPING EXPLOSIVES

Daniel D. Huyett, Wilmington, Del., assignor to Atlas Powder Company, Wilmington, Del., a corporation of Delaware Application August 31, 1939, Serial No. 292,955

51 Claims. (Cl. 93—2)

This invention relates to wrapping machines. It is primarily intended to provide a structure by means of which groups of solid pellets of black powder or like explosive material may be expeditiously assembled and wrapped. The wrapping material employed is preferably, though not necessarily, paper, and it is a primary object of the invention so to wrap the groups of pellets that only a single thickness of paper will lie across the ends of the pellets.

It is desirable to have the package of pellets so wrapped that the resultant assembly will be waterproof, but it is also highly important that as little wrapping material as possible shall lie between the ends of adjacent assemblies. The pellets are sometimes provided with cores of high explosive material, and the explosive "sticks" constituted by the wrapped packages are frequently placed end to end in bore holes under conditions where the setting off of the complete charge is dependent upon the transmission of a detonating wave lengthwise through the whole group. Any excessive thickness of wrapping material at the ends of the explosive sticks tends to lessen the certainty of the transmission of this detonating wave, and consequently introduces dangerous elements of chance in the already very hazardous occupations of mining, quarrying, and the like.

As this description proceeds, it will be seen that the machine constituting the subject matter of the present invention possesses valuable characteristics adapting it for the neat and expeditious winding of cylindrical objects of many kinds, and its usefulness is not limited to the explosive wrapping field. However, the collecting and wrapping of groups of pellets of explosive material constitutes a very important feature of invention and is the feature to which I attach especial importance at the present time, for the reason that it is very desirable in the packaging of black powder in stick form to provide an assembly which the miner may break off at various points in its length, when desired.

That is to say, if the particular blasting job at hand does not require the use of a whole stick of the explosive, the miner may easily break the stick in two, or even into quarters, where the stick is made up of four different pellets, as is now usually the case. However, if the miner is to be able to break the stick as described, with his hands, it follows that the wrapping material employed must be relatively light.

Therefore, one of the problems presented in the development of the machine of the present invention was to provide a relatively light wrapping and to wrap four separate pellets in this light wrapping in such fashion that the resultant package would be neat, free of wrinkles, tight, waterproof, and have flat ends consisting of only a single thickness of the relatively light paper.

Further objects and advantages of the invention will be set forth in the detailed description which follows.

Figure 3:
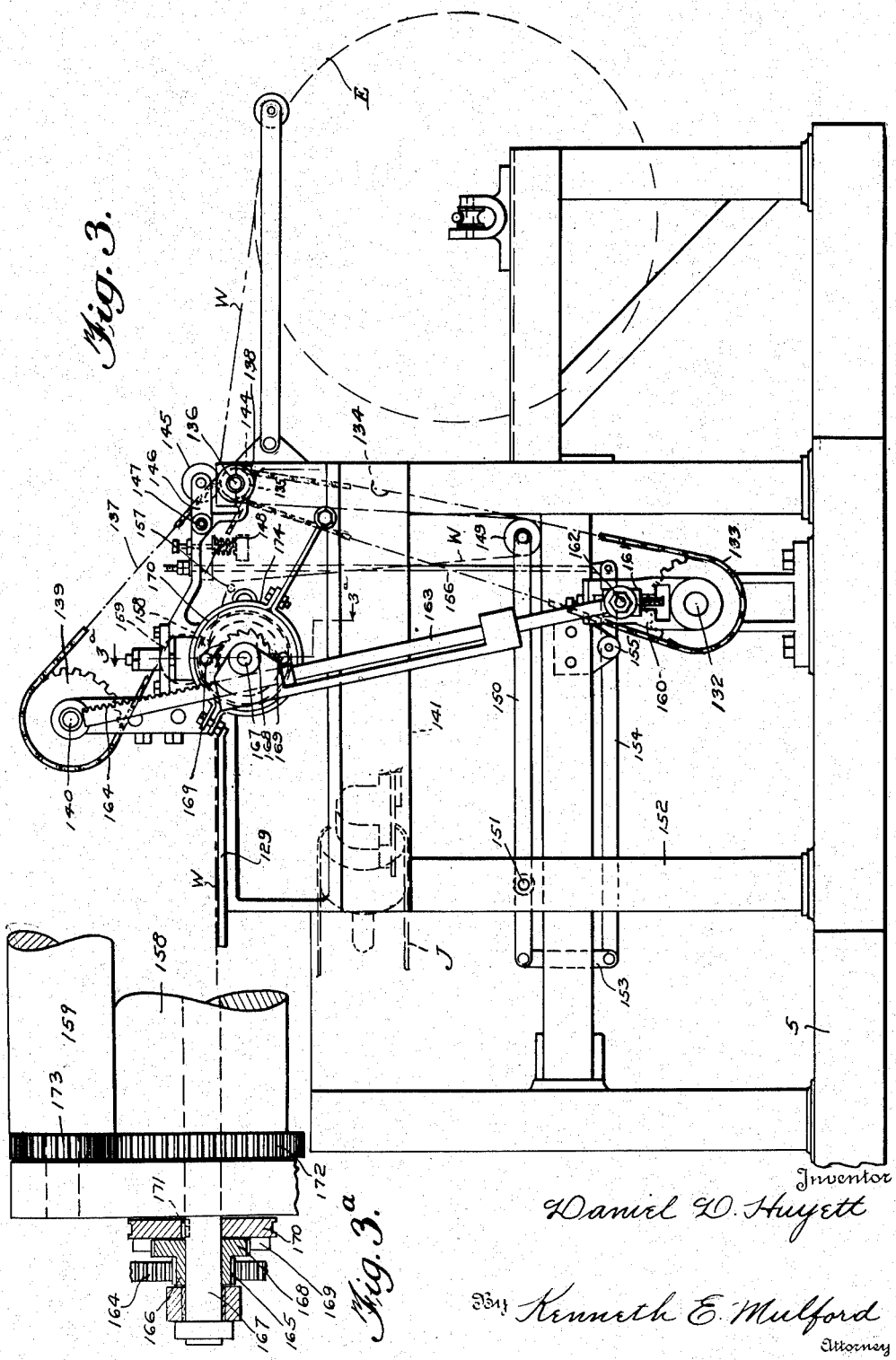
Fig. 3 is a side elevation of the paper feeding mechanism hereinafter described.
Figure 4:
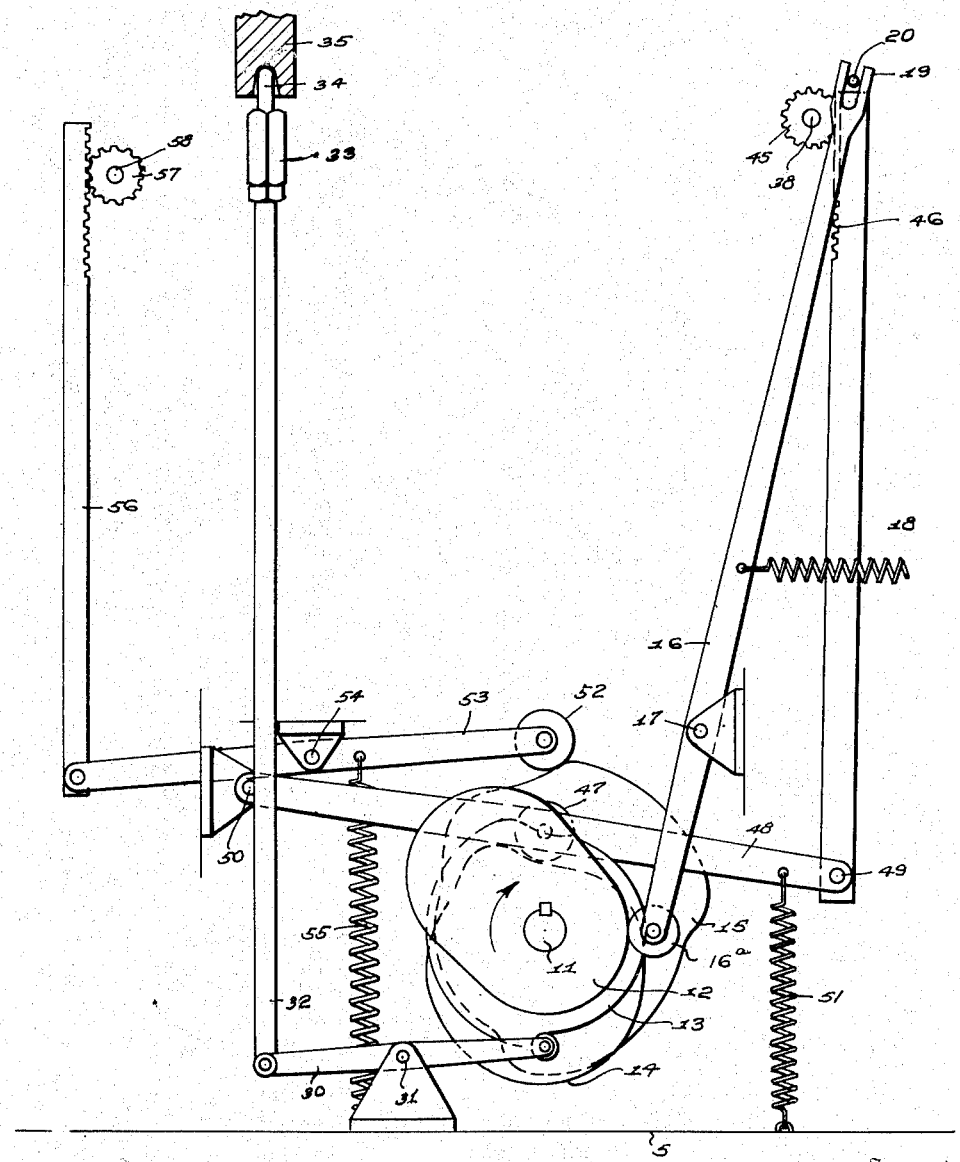
Figure 8:
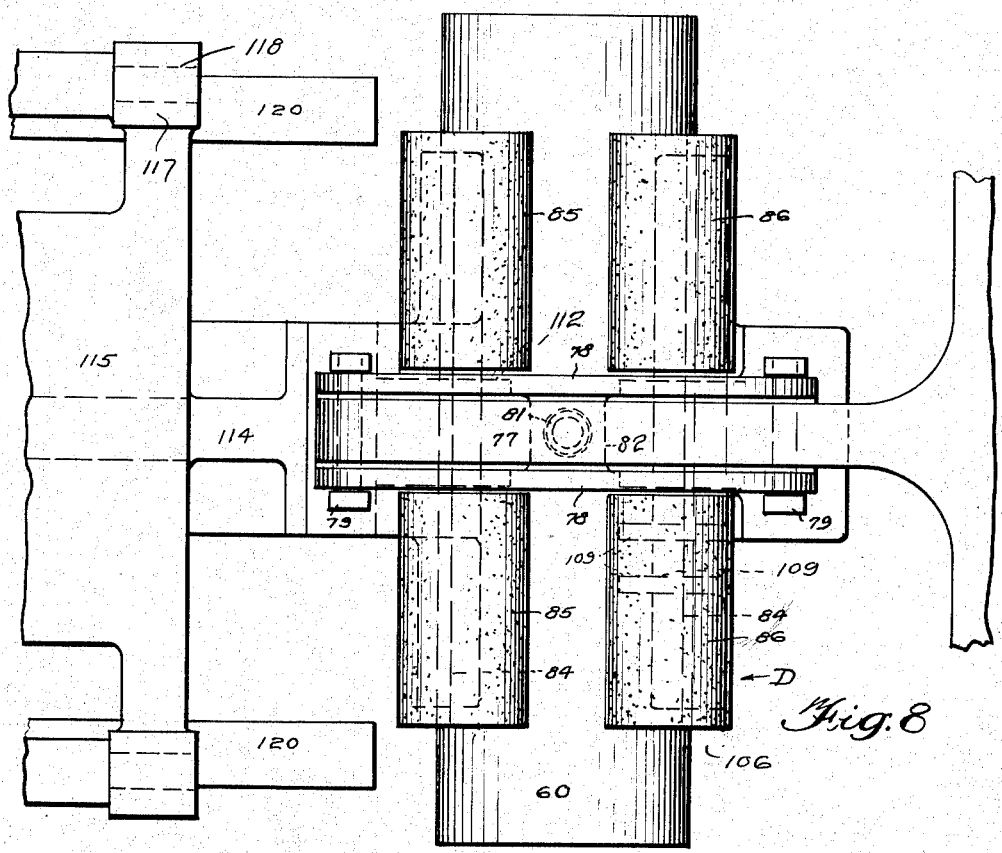
Figure 9:
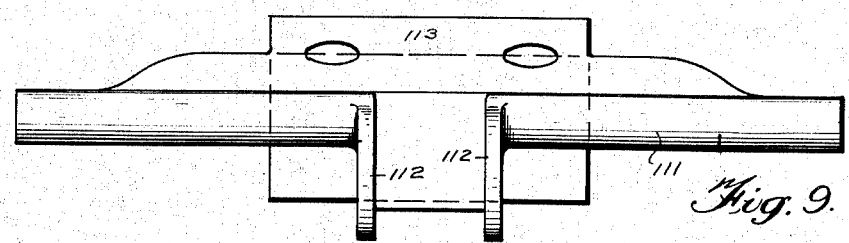
Figure 10:
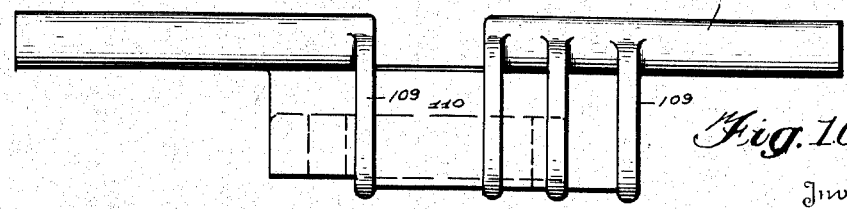
Figure 14:
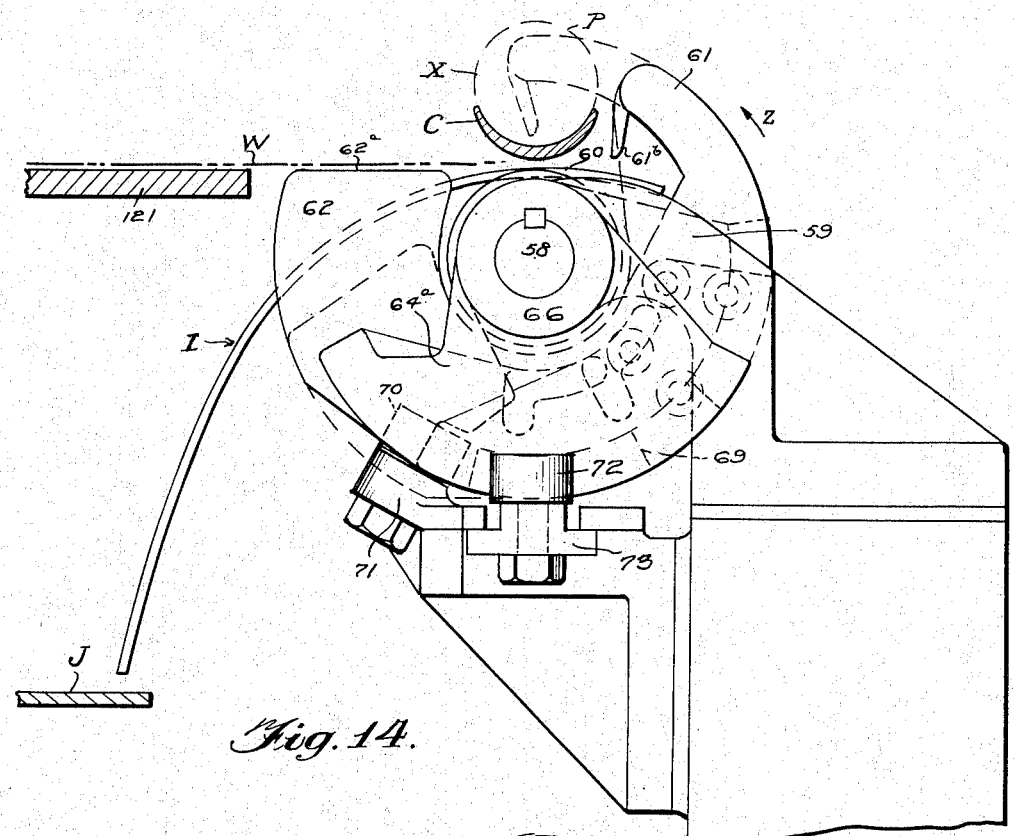
Figure 15:
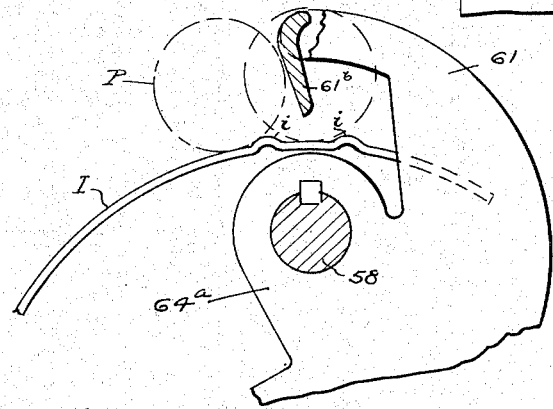
Figure 22:
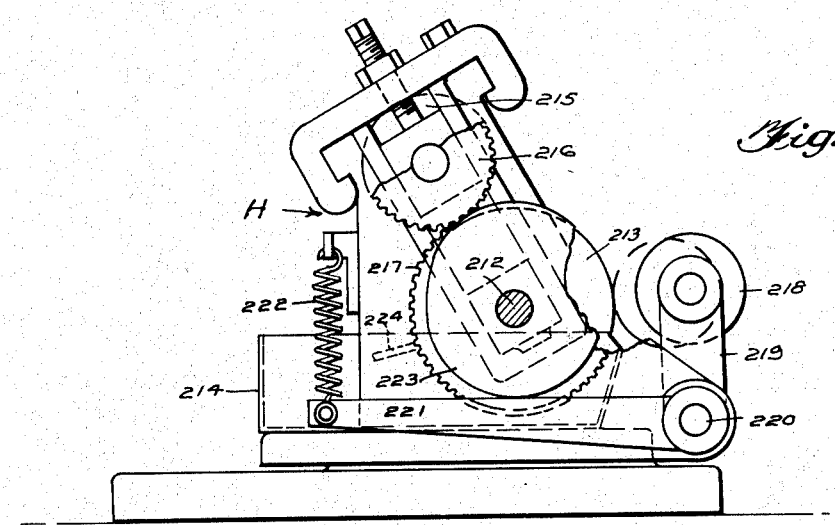
Figure 23:
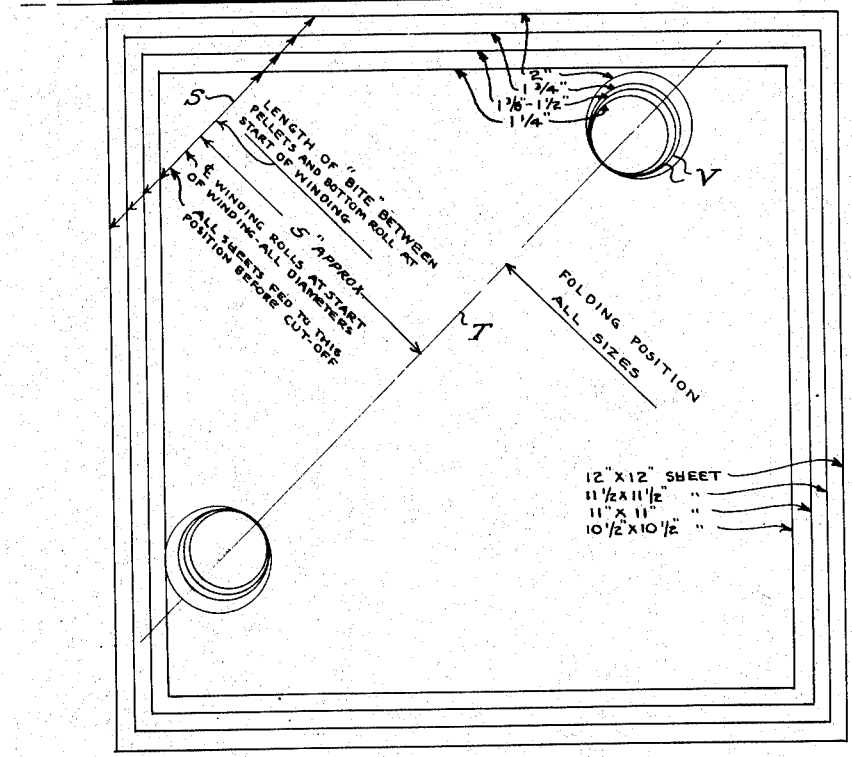

Fig. 3ª is a fragmentary vertical sectional view on line 3ª—3ª of Fig. 3, showing the paper feed rollers;

Fig. 4 is a diagrammatic view illustrating the relationship of the various actuating cams of the machine and associated parts;

Fig. 5 is an enlarged view of the forward end of the winding head hereinafter described;

Fig. 6 is a detail view of a cam and lever used for retracting one of the straight edges, hereinafter described;

Fig. 7 is a transverse sectional view of the straight edges, hereinafter described, upon line 7—7 of Fig. 5;

Fig. 8 is a plan view of the winding or wrapping rolls of the winding head;

Figs. 9 and 10 are front elevations of paper guides associated with the winding head and which serve to aid in guiding the paper as it is wound around the pellets to be wrapped;

Fig. 11 is a front elevation of the lower winding roller, the folders, the carrier tray by which four pellets at a time are presented for the action of the winding rolls, and associated parts;

Fig. 12 is a plan view of the structure illustrated in Fig. 11;

Fig. 13 is a detail view of an equalizing structure employed for equalizing the throw of the folders of Fig. 11;

Fig. 14 is an enlarged right-hand end view of the right-hand folder of Fig. 11 with the feed tray, table and take-off belt in section;

Fig. 15 is a sectional view on line 15—15 of Fig. 11;

Fig. 16 is a plan view of the knife, glue mechanism, and associated parts;

Fig. 17 is a front elevation of the knife and glue transfer foot, hereinafter described;

Fig. 18 is a detail view of a cam and associated parts for actuating the glue transfer foot;

Fig. 19 is a detail view of a knife frame, hereinafter described;

Fig. 20 is a vertical sectional view through the knife and its frame;

Fig. 21 is a plan view of the stripper bars which are associated with the knife;

Fig. 22 is a side elevation of the glue mechanism;

Fig. 23 is a face view of a sheet of paper illustrating how the point of bite and the point at which the fold occurs remain the same for all sizes of sheets and all sizes of finished packages;

Fig. 24 is a diagrammatic view illustrating the time at which the various operations occur in the cycle of operation of the machine;

Fig. 25 is a detail side view of the actuating mechanism of the pellet transfer slide;

Fig. 26 is an end elevation of the structure of Fig. 25;

Fig. 27 is a fragmentary perspective view of a package partially wrapped in accordance with the invention;

Fig. 28 is a plan view of a completed package, and

Fig. 29 is a side view of the completed package of Fig. 28.

Like numerals designate corresponding parts throughout the drawings.

In its broadest aspects, the machine of the present invention comprises an input conveyor A (Fig. 1) upon which the pellets are fed and by which they are conveyed, lying in end to end relation, in the direction of arrow $a$ to a point in front of a laterally acting transfer pusher B. This pusher acts to deliver a selected number of the pellets (in the present case, four) into a charging tray C. This tray reciprocates lengthwise and delivers the group of pellets to the winding head D.

The paper is fed from a large roll of paper E by feed mechanism F past a cut-off knife G. It will be noted that the line of travel of the paper is substantially at an angle of 45° to the axis of the rolls of the winding head. The result is that the paper is presented to these rolls in such fashion that a corner, and not a side, of the paper is fed into position to be engaged by the winding rolls, as hereinafter described.

The knife acts to cut the paper off at such a point that the resultant sheet is substantially square (see Fig. 23). The width of the finally delivered sheet is determined by the width of the web of paper fed from the roll E, while the length of the sheet cut off is determined by the setting and throw of the feed mechanism, as will be hereinafter described. Fore and aft bodily adjustment of the knife blade with respect to the knife frame properly positions the knife when changing sizes of packages, or, in the case of explosives, when changing sizes of cartridges.

The cutting off movement of the knife G acts to apply a dab of glue from a glue mechanism H, to the upper face of that corner of the sheet which lies diagonally opposite the corner first engaged by the winding rolls. After the wrapping of a package has been completed, the next thrust forward of the tray C with a new supply of pellets ejects the finished package, said package being delivered down an inclined runway I to a take-off conveyor J.

The machine comprises a base plate 5, carrying suitable pedestal bearings and other supports for the mounting of the remainder of the mechanism. A main drive shaft 6, mounted in bearings 7, drives through spur gearing 8 to a countershaft 9. Shaft 9 drives through bevel gearing 10 to a main cam shaft 11 (see Fig. 4). This cam shaft carries cams 12, 13, 14 and 15.

Cam 12 acts against the lower end of a lever 16 through roll 16ª (said lever being pivoted at 17) to move said lever to the left against the action of spring 18, the cam and spring complementally serving to swing the upper forked end 19 of said lever back and forth. This forked upper end engages pin 20 of a slide 21, that is mounted in bearings 22. The inner end of this slide carries a pusher head 23 which acts to thrust four pellets laterally beneath a pivoted plate 24 and over a grid 25 into the tray C.

Figure 1:
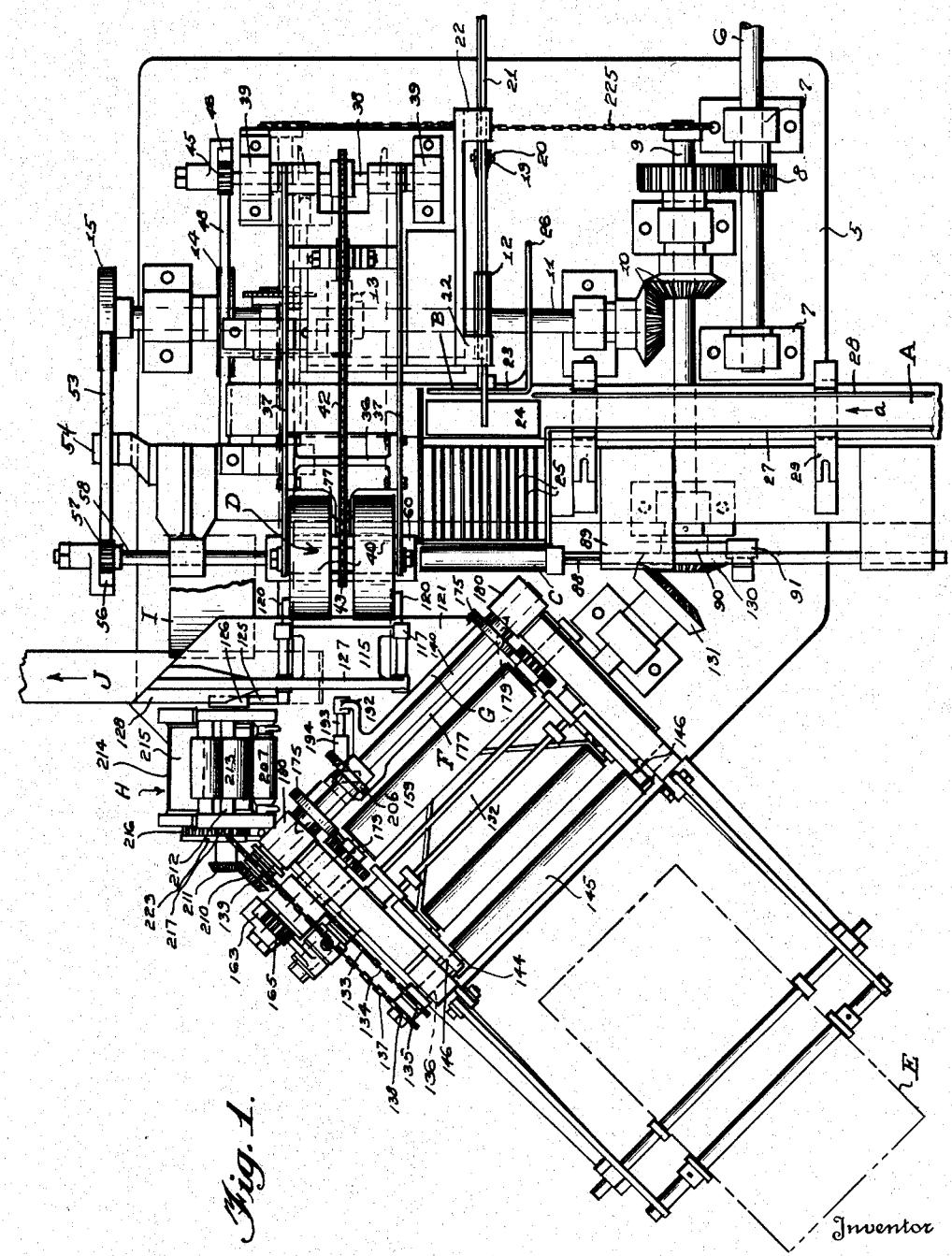
Figure 1 is a plan view of the device of the present invention, with parts omitted where necessary to preserve the clearness of the drawings.

During the time that the pusher is projected toward the left in Fig. 1, additional pellets are held against moving into the path of the pusher by a wall 26, which constitutes a part of the pusher. At this time, the belt A merely slips beneath the row of pellets thereon. The purpose of the grid 25 is to get rid of powder spalls and dust. In their movement along the conveyor, the pellets are guided by guide walls 27 and 28. The wall 28 is a fixed wall, while the wall 27 may be adjusted by its carrying brackets 29 to accommodate varying sizes of pellets.

The cam 13 (Fig. 4) acts upon a roller carried by one end of a rock lever 30, said lever being pivoted at 31. Rocking movement of this lever imparts a raising and lowering movement to a rod 32. This rod has an adjusting turnbuckle 33 in its length, by which its effective length may be varied in accordance with the diameter of the pellets that are being wound at a given time. A ball-pointed upper end projection 34, upon the rod, enters a socket of a projection 35 which projects downwardly from the underside of the frame 36 of the winding head D.

This frame comprises the side members 37, the rear ends of which are freely pivoted upon a shaft 38, that is mounted in bearings 39. A pair of relatively large driving and winding drums 40 are mounted upon spindle 41, that is carried at the forward or free end of the winding frame. Turning movement is imparted to the drums 40, through sprocket chain 42 and suitable sprocket wheels 43 and 44, from the shaft 38. The necessary turning movement is imparted to shaft 38 by pinion 45 and rack 46 (Figs. 1 and 4) through the medium of cam 14.

Cam 14 acts against a roller 47, that is carried by a bar 48, the latter bar being pivotally connected at 49 to the lower end of the rack 46. Bar 48 is pivoted at 50, and a spring 51 tends to draw its outer end downwardly. The cam 15 (Figs. 1 and 4) acts against a roller 52, that is carried by a bar 53, the latter being pivotally mounted at 54. A spring 55 tends to draw roller 52 toward cam 15.

The movement of the cam imparts vertical reciprocation to a rack bar 56, the teeth of which mesh with a pinion 57 upon a shaft 58. The shaft 58 (see Figs. 1, 4 and 11) is journaled in suitable bearings 59 and constitutes a mounting for the lower wrapping roller 60, upon which the pellets are supported during the wrapping operation. The shaft 58 also constitutes the actuating means of and a support for supporting fingers 61 and folders 62, these members being of arcuate formation and having swinging movement about roller 60, as will be presently set forth.

The folders and supporting fingers are bolted, as illustrated in Fig. 11, to bars 63, and these bars in turn as suspended upon arms 64, 64ª of collars 65 and 66. The collars 65 and 66 are splined at 67 upon shaft 58, so that while the bars 63, along with the folders and supporting fingers, may move toward and from each other along the shaft, they must partake of the rotary motion of the shaft.

Springs 68 tend to move the folders toward each other, while cams 69, carried by the arms 64ª, act against fixed rolls 70 upon brackets 71 to move the folders away from each other and against the tension of the springs 68. The outer and inner faces of the cams 69 are engaged by rollers 72, 72ª respectively, which upstand from the sliding bars 73. The movement of these bars is equalized by pinion 74 (Fig. 13) which meshes with rack teeth 75. This equalizing mechanism serves to shift the group of pellets endwise to just the degree necessary to properly center the group with respect to the sheet of paper within which they are to be wound.

As is hereinafter set forth, the pellets vary somewhat in length, and the construction shown takes care of this variation in length and still brings about accurate centering of the whole group of pellets with respect to the position that they are to occupy in relation to the paper sheet. The equalizing mechanism further serves to insure the same degree of pressure against the pellets and wrapping material at each end of the package being wrapped.

Ledges 76, upon the inner faces of the folders, constitute surfaces over which the paper moves and by which the paper is supported after the folders have completed their arcuate movement and have moved toward each other and toward the ends of the pellets, said folders then constituting abutments by which the paper is caused to fold over in a novel way, as will be more particularly set forth in the detailed description of the operation of the machine.

Referring again to Fig. 5, and also to Fig. 8, 77 designates a neck extension of the winding head frame which projects forwardly beneath the spindle 41. This neck extension serves as a mounting for a pair of plates 78. Pins or bolts 79 pass through the neck extension and through slots 80 of the said plates. A spring 81 bears between 77 and a tie member 82, which unites the plates 78. Thus these plates have a limited floating mounting with respect to 77. The plates 78 carry arcuate guides 83 which function in a manner which will be hereinafter described.

The spindles 84 of four rubber-covered, winding and wrapping rolls or rollers, 85, 86, are carried by the plates 78, said rolls being free to turn with respect to these spindles. The rolls are arranged in pairs, the rolls 85 being upon one spindle and the rolls 86 being carried by the other spindle; and the rolls of the pairs are disposed upon opposite sides of the neck extension 77. Thus, the rolls are supported from their inner ends. That is to say, no supports are required at the outer ends of these rolls. This leaves the spaces at the outer ends of these rolls free of any obstructions and permits the passage of the pellets, to be wrapped, endwise between these rolls and the lower winding roller 60.

Rotation is imparted to the rolls 85 and 86 by the winding drums 40 as said drums are turned by the sprocket mechanism described. Since the drums 40 are much larger in diameter than the rolls, it follows that a single revolution of drum 40 will impart a number of turns to the rolls. The loose connection provided by the slots 80 between plates 78 and neck extension 77 has the effect that when the winding head starts to lift under the influence of rod 32, the drums are first lifted slightly from the upper wrapping rolls 85 and 86, thus leaving these rolls free to turn without interference by the drums 40. Continued upward movement of the winding head frame lifts the upper winding rolls slightly to facilitate the endwise entry of the tray of pellets between the upper wrapping rolls 85, 86 and the lower wrapping roller 60.

The tray C is best illustrated in Figs. 1, 11, 12 and 14. In Fig. 11, one group of four pellets, P, is shown resting in the tray. This tray is secured by cap screws 87 to a slide 88 that is mounted to reciprocate in a bearing 89. Referring to Figs. 25 and 26, it will be seen that this slide 88 is actuated by a cam 90, on shaft 9. Cam 90 acts against a roller 91, that is carried by the lower end of a two-part lever which has a pivotal mounting upon the frame of the machine at 92. A central bar 93, constituting a part of said lever, that is pivoted at 92, lies between a pair of side bars 94 which have a common pivotal mounting with 93 at 92. The lower ends of these side bars are rigidly secured to a lower end extension 95, by which roller 91 is carried.

The side bars 94 carry cups 96, in which are mounted springs 97 for forcing the ends of plungers 98 into correspondingly shaped depressions in the sides of the central bar 93. This central bar 93 is forked at its upper end, as indicated at 99, for engagement with a pin 100 of the slide 88. A spring 101 tends to draw the slide toward the right in Fig. 25.

If the slide, tray and pellets encounter no unusual obstruction which would increase resistance to their movement, the parts of the lever remain in alignment, and the whole two-part structure functions as a unit. If, however, increased resistance is encountered by the slide by reason of a jamming of the paper or pellets, or the introduction of any other obstruction to the normal movement of slide 88, such increased resistance will cause the plungers 98 to ride out of the depressions in the sides of the central bar 93, and spring 101 will act to draw the central bar back against a rubber stop 102.

The side bars, however, will continue their movement under the action of cam 90, and a projection 103, upon one of said side bars, will engage the end of a trip lever 104 to actuate a valve 105, constituting the control member of a fluid-controlled clutch by which power is transmitted to the main shaft 6 of the machine. This fluid-actuated clutch is not illustrated. Clutches of this character are well known in the art of handling explosives. The danger inherent in the use of electric circuits around machines handling explosives, prohibits the use of electrically controlled clutches and renders undesirable even mechanically controlled clutches. It is common practice to employ fluid-controlled clutches in connection with explosive handling machines.

When the slide 88 moves toward the left in Fig. 11, the pellets are projected to the dotted line position indicated at X in Figs. 11 and 14. That is to say, the tray is projected inwardly between the upper winding rolls and the lower wrapping roller. Then the supporting fingers 61 move to the dotted line position illustrated in Fig. 14, at the termination of which movement the shape of cams 69 permits movement of the fingers 61 at the opposite ends of the group of pellets toward each other to such an extent that the pellets are gripped and supported while the tray C is being withdrawn.

The cams 69 then move in the opposite direction to slightly separate the fingers 61 against the tension of the springs 68, and this permits the group of pellets to rest upon the lower winding roller 60. The timing of the movement of the various parts is illustrated in Fig. 24, and in addition, it is only necessary to say that in the initial downward movement of the winding head and the upper winding rolls 85 and 86, said rolls 85 and 86 engage the pellets before the drums 40 engage the said rolls.

In other words, the engagement of these rolls with the pellets is at a time when said rolls are free to turn upon their spindles and at a time when the plates 78 are free to rock upon their loose mountings. The result is that the pellets are accurately aligned and centered upon the lower roller 60. Continued downward movement of the winding head brings the drums 40 into engagement with rolls 85, 86, so that when the drums are rotated, said rolls will likewise be rotated to in turn rotate the pellets and wrap the sheet of paper around the group of pellets.

A guide bar 106 is removably mounted at 107 upon a supporting bracket 108 and carries guide fingers 109. The finger 83ª of the guide 83 projects into the space 110 of the guide 106 or into overlapping relation to the fingers 109, it being observed that the guide 83 extends somewhat more than 180° around the position occupied by the pellets when they are being wrapped. In like manner, a bar 111 is provided with guide fingers 112 which coact with guide finger 83 at the forward side of the pellet wrapping position.

The guide bar 111 is provided with a base 113 which is supported upon a shank 114 of a T-shaped plate 115. A web 116, extending from this plate, is provided with bearing extensions 117 in which the pintles 118, of swinging arms 119, are mounted. The arms 119 support elongated folders or straight edges 120 which hang in slightly spaced relation to and above the table 121 over which the wrapping paper of the explosive packages moves.

Downwardly extending ears 122 of the T-shaped plate are traversed by bolts 123, said bolts 123 passing through the swinging arms 119. Springs 124 encircle these bolts and bear between the downwardly extending ears 122 and the arms 119. Thus these springs tend to resist inward movement of the straight edges or folders 120, and by inward movement, I mean movement of these straight edges toward each other.

The initial movement of the folders toward the left in Fig. 14 takes place at a time when the cams 69 restrain bodily inward movement of the folders toward the pellets under the action of the springs 68, and in this initial movement of the folders, the paper is folded upwardly across the ends of the end pellets and against the straight edges. The movement of the folders toward and from the ends of the pellets need be but a slight one, and in the said initial movement across the pellets, the folders lie in relatively close relation to the pellets but out of actual contact therewith.

Additional swinging movement of the folders to the left brings the cams 69 to such position with relation to rollers 70 that said rollers no longer restrain the action of springs 68, and said springs cause the folders to snap over toward the straight edges, said straight edges then yielding slightly under the action of their springs 124. Thus the paper, while being yieldingly held, is held in a position sharply upturned over the straight edges and over the ends of the pellets.

While the oblique feeding of the paper to the winding head presents a point and not a side of the paper to the winding rolls, the sharp upturning of the paper over the straight edges gives a straight line to the paper and presents a fold which moves in parallel over and is supported by ledges 76 as the paper is drawn toward the pellets by the turning movement of said pellets and the winding rolls.

The spindle of that straight edge that is disposed toward the discharge side of the machine in Fig. 1 carries a crank extension 125 that is acted upon by a cam 126. The function of this cam, which is driven from an element of the glue mechanism hereinafter described, is to move the corresponding straight edge inwardly at the proper time to prevent interference with a wrapped package that is being discharged on to the conveyor J as hereinafter described. The straight edges and the parts by which they are carried are supported from a bracket 127, which upstands from a base plate 128.

The shaft 9 (Fig. 1) carries a bevel gear wheel 130 which, through a corresponding gear wheel 131, drives a shaft 132. Sprocket wheel 133, upon this shaft, drives through a conventional sprocket chain indicated at 134 to a sprocket wheel 135, on a shaft 136. An endless sprocket chain 137 (Fig. 3) passes over another sprocket wheel 138, also mounted upon shaft 136, outside of sprocket wheel 135. This chain also passes over a large sprocket wheel 139, that is mounted on the knife actuating shaft 140. Chain 137 is driven from shaft 136 and in turn drives shaft 140.

The paper web W is led from the paper roll E over a primary feed roller 144 on shaft 136 and beneath a pressure roller 145 that is mounted in the outer ends of rock arms 146. These rock arms are pivoted at 147, and their inner portions bear upon springs 148. These springs tend to move the roller 145 toward the roller 144. From the roller 144, the paper web W is led downwardly beneath a dancer roll 149. This roll is mounted to turn in the outer ends of arms 150. These arms are pivoted at 151 to a standard 152, and their ends opposite the roll 149 are connected by link 153 with corresponding arms 154. These latter arms are pivoted at 155 and their ends opposite the link 153 are connected by rods 156 with the rock arms 146. The purpose of this arrangement will be hereinafter set forth.

From the dancer roll, the paper web W is led over a tension rod 157 and passes from this rod to and between the main feed rollers 158, 159 (Figs. 1, 3 and 3ª) and thence over the table 121 to the winding head. Intermittent feeding movement is imparted to the feed roller 158 from shaft 132 through the medium of a variable throw crank 160. A sliding block 161, carried by said crank, has pivotal connection at 162 with a rack bar 163. The teeth 164 of this bar mesh with pinion teeth 165 on a sleeve 166 (Fig. 3ª).

This sleeve is mounted to turn on shaft 167 of the main feed roller 158. A ratchet wheel 168 is secured to and turns with the sleeve so that as the rack bar 163 rises and falls, oscillation is imparted to the sleeve by the pinion, and, consequently, oscillation is likewise imparted to the ratchet wheel 168. Pawls 169, pivoted upon the face of a brake drum 170, engage the teeth of the ratchet 168 so that in counter-clockwise movement of the ratchet, rotation will be imparted to this brake drum and through the brake drum to the shaft 167 and the main feed roller carried thereby. To effect this, the brake drum is keyed to shaft 167, as indicated at 171.

Rollers 158, 159 are preferably geared together by gearing 172, 173 (Fig. 3ᵃ). A brake band 174 engages the brake drum and insures against overthrow of the rollers in their feeding action. It will be observed that this feeding action is an intermittent one, and during the time that the feed rollers are standing idle, the dancer roll 149 acts to take up slack in the paper web W and to store up a length of paper so that upon the next feeding movement of the feed rollers, the necessary amount of paper will be supplied without having to vary the rate of speed of roller 158 at any time. If so much slack should be stored up as to permit the dancer roll to descend beyond a predetermined point, then lowering of this roll will, through the connections described, draw downwardly upon rods 156 and, through rock levers 146, lift roller 145 away from roller 144. In the absence of the pressure of roller 145 upon roller 144, there will be no further feeding of paper from the roll E.

The knife actuating shaft 140 carries a pair of cams 175 which act once during each revolution of said shaft against rolls 176 of a knife frame 177, to depress said frame against the action of springs 178. This knife frame is provided with V-shaped ends 179, which travel in suitable ways, formed in bearings 180 of the machine frame. The underface of the knife frame carries two rows of teeth 181, (Figs. 19 and 20) adapted to engage correspondingly shaped teeth 182 upon the top of a knife carrying block 183.

Bolts 184 provide means for adjusting the block 183 fore and aft of the knife frame in the line of travel of the paper, which is indicated by the heavy dot and dash line in Fig. 20. The knife blade 185 is carried by block 183 and is adapted to enter any one of the slots 186 of a shear bar 187 that is carried by the table 121.

Stripper bars 188 and 189 are spring mounted with respect to block 183 through the medium of springs 190 and suitable guide pins 191. The movement of the paper is in the direction of movement of the arrow y in Fig. 20. The purpose of providing the fore and aft adjustment of the knife with respect to the knife frame is to render it possible to cut off pieces of varying lengths from the paper web, as determined by the diameter of the pellets being wound at a given time.

By referring to Fig. 1, it will be seen that the direction of movement of the paper is oblique to the direction of movement of the groups of pellets both before and during wrapping of the latter. In order to provide means for applying a dab of adhesive to that corner of the sheet diagonally opposite the point of the sheet that is first engaged with the winding rolls, I mount upon the rear face of the knife, bearing extensions 192.

An oscillatory shaft 193 (Figs. 16 and 17) journaled in these bearings, supports a sleeve 194. This sleeve is adjustable endwise of shaft 193 through the medium of a set screw 195 and is splined upon said shaft. The purpose of this adjustment is to shift the position of a glue pad 196 in accordance with the size of the cut-off sheet in which the pellets are wrapped.

The glue pad 196 is carried by a foot 197 that is secured by bolts 198 to a depending arm 199 of sleeve 194. Oscillatory movement is imparted to the shaft 193 by means of a rack 200 and pinion 201. The rack projects downwardly from a head 202. A spring 203 bears between this head and the knife frame, said spring tending to elevate the rack and head. A roller 204, carried by a vertical extension 205 of said head, is depressed by the action of a cam 206 on the shaft 140. The vertical extension 205 is slotted at 205ᵃ to embrace and be guided by shaft 140.

Thus the action of the cam 206 results in imparting a swinging movement to the glue pad 196 and foot 197 from the vertical position illustrated in Fig. 17 and in an arcuate path upwardly; while the action of the spring 203 results in returning the glue pad and foot to the vertical position illustrated in Fig. 17. This swinging movement carries the glue pad into contact with a glue carrying roll 207 of a glue applying mechanism, while the actual operation of pressing the glue-laden pad into engagement with the paper is effected by the downward movement of the knife under the action of the cams 175.

The stripper bars 188 and 189 are illustrated in plan view in Fig. 21. Here it will be seen that the bar 189 is a plain bar, while the bar 188 carries an adjustable stripper foot 208 having an opening 209 therethrough, through which the glue pad moves in the downward movement of the knife. The capability of this foot 208 to be adjusted lengthwise of the bar 188 renders it possible to adjust the position of the opening 209 in accordance with the adjustment of the sleeve 194 so that the opening will be in the proper position to receive the glue pad in the downward movement of the knife, while at the same time said glue pad will be closely surrounded by a stripper surface which will act to hold the sheet from lifting with the glue pad when the latter rises in the upward movement of the knife.

By means of the bolts 208ᵃ and slots 208ᵇ (Fig. 21), stripper foot 208 may be adjusted endwise of bar 188 to properly position the dab of glue upon sheets of varying widths. The dotted line position of 209 in Fig. 21 indicates that 209 has been shifted inwardly by adjustment of 208ᵃ, 208ᵇ to take care of a narrower sheet of paper and has been adjusted by the bolts 184 and teeth 181, 182 (Fig. 20) to take care of the correspondingly shorter sheet, it being understood that bolts 184 pass through slot-shaped openings in head 177 to permit this adjustment.

The glue mechanism is driven from the shaft 140 by means of sprockets, chains, and bevel gears 210 and 211. The gear 211 is on the shaft 212 of a fountain roll 213, the lower portion of which projects into a body of glue in a pan 214 (Fig. 22). A doctor roll 215 bears upon the fountain roll, and gears 216 and 217, carried by the shafts of these rolls, mesh with each other. A duct roll 218, mounted in swinging arms 219, that are pivoted at 220, is moved through the medium of a lever 221 and spring 222 to have movement toward and from the fountain roll.

When the duct roll is moved outwardly by the action of the spring, it lies in position to be wiped over by the glue pad 196 in the arcuate movement of the latter. Movement of the duct roll in the opposite direction is under the influence of a cam 223 on shaft 212 and against the tension of spring 222. A scraper 224, scraping against the surface of the fountain roll, may be employed if desired, but this is a feature very common in glue applying mechanisms and constitutes no essential part of the invention.

Figure 2:
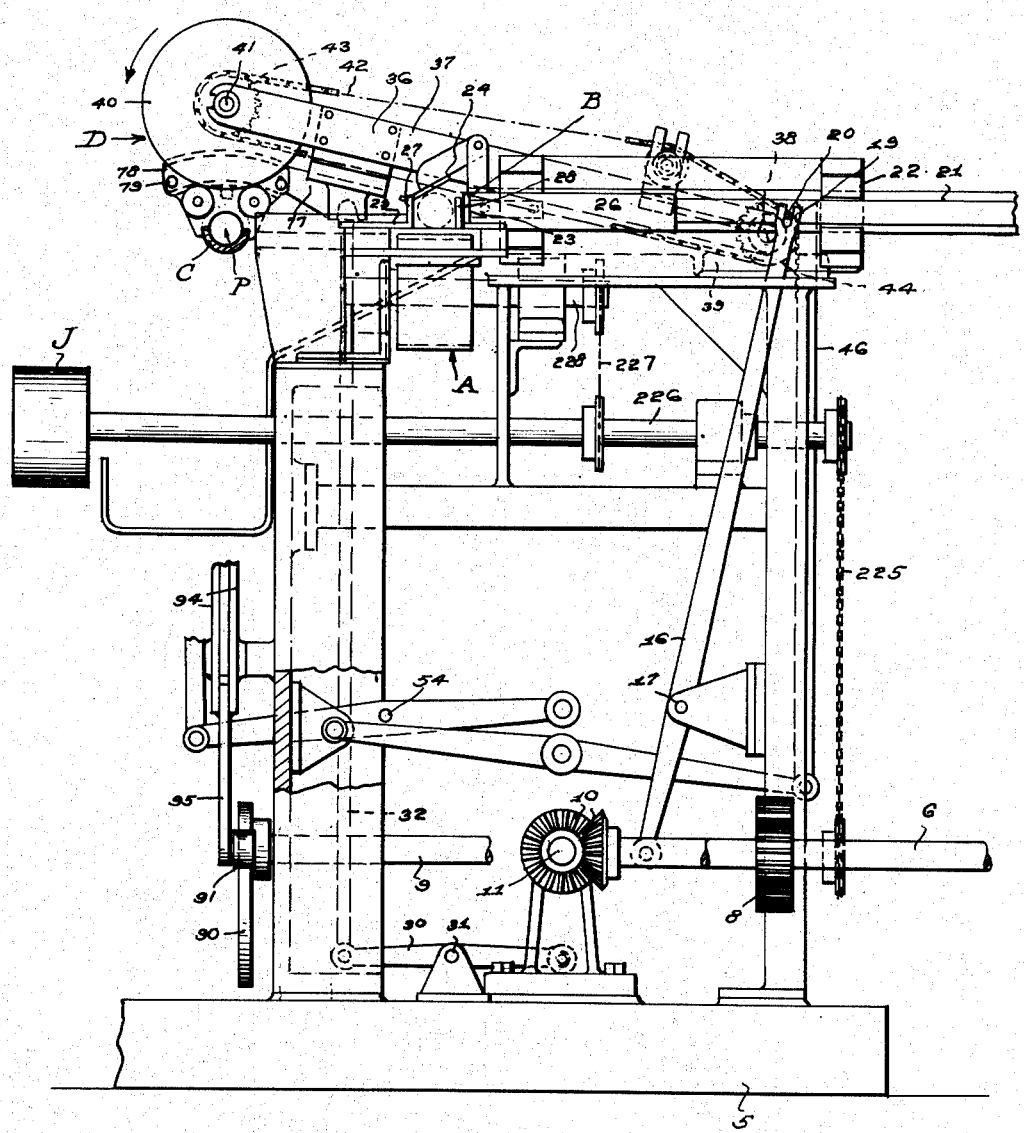
Fig. 2 is an end elevation of a part of the machine with some of the parts omitted.

The shaft 9 (Fig. 2) drives through sprocket mechanism 225 to a transverse shaft 226. This shaft in turn drives through sprocket mechanism 227 to shaft 228, which constitutes the drive shaft for the input conveyor A. Shaft 226 constitutes the drive shaft for the take-off conveyor J.

The machine of the present invention is primarily intended for wrapping pellets of the following diameters: 1¼", 1⅜", 1½", 1¾" and 2", all pellets being 2" long and there being four pellets to the cartridge, making all of the cartridges to be handled by this machine theoretically 8" long. However, due to inequalities in the pellet presses, the combined length of four pellets varies between 7¾" and 8". As before stated, this variation in the overall length of the group of pellets is compensated for by the endwise yieldability of fingers 61.

The adjustment of the blade of the knife fore and aft with respect to the knife frame 177, as illustrated in Fig. 20, compensates for this variation in the sizes of the pressed pellets as they are delivered from the pellet presses. The arrangement shown in Fig. 20 is designed to give a total adjustment of ¾" between the smallest and the largest sheets employed, the size of the sheets being 10½" sq. for 1¼"; 11" sq. for 1⅜" and 1½"; 11½" sq. for 1¾"; and 12" sq. for 2" diameter pellets.

The length of the sheet as cut off by the knife is determined by the setting of the variable throw crank 160 of the paper feed mechanism (Fig. 3), while the width of the sheet cut off is determined by the width of the web delivered from roll E, it being understood that the roll must be changed when changing the sizes of the packages being wrapped. The position of the sheet on the table is determined by the position of the knife in each case, and irrespective of the sizes of the sheet.

After the sheet has been fed to cut-off position, the point diagonally opposite the glue pad extends over the center line of the lower winding roller and partly around the underside of the tray, said sheet being guided in this movement by the guide fingers 109 as hereinbefore described. In Fig. 23, S indicates the position of the center line of the pellets at the time that the winding rollers 85 and 86 close down upon the pellets and the paper prior to the start of the wrapping operation.

The line T, in Fig. 23, indicates the center line of the row of pellets at the point where the folders come into play and the paper is folded across the ends of the outermost pellets. The several circles, V, indicate the amount of paper actually lying against the ends of the pellets for the different sizes of pellets. Fig. 23 is intended to emphasize the fact that the folding position is the same for all sizes of pellets, and that the point of bite is the same for all sizes of pellets, and that the distance between these two points is approximately 5" for all sizes of pellets. This greatly simplifies the timing of the machine.

While it is necessary to provide an adjustment for the knife, as illustrated in Fig. 20; and while it is necessary to substitute new assemblies of rollers 85 and 86, by removing pins 79, in changing from one diameter of wrapped package to another; and while it is necessary to substitute different sizes of guide fingers 110 and 112 in changing from one size package to another and to adjust the throw of the winding head, the fact that the distance between T and S in Fig. 23 remains the same for all diameters of wrapped packages renders it unnecessary to change the timing of the various cams and parts actuated thereby. This simplifies the machine and saves a great deal of time wh' 1 would be consumed if it were necessary to change the timing of the actuating mechanism of the machine every time the size of the package to be wrapped was changed.

It is believed that the timing diagram, Fig. 24, will readily make clear the sequence of operation of the various parts. However, it may be stated that from the feeding and cutting mechanism, the sheet passes over table 121, the point of the sheet entering between the winding rolls at a 45° angle to the axis of the winding rolls and to the axis along which tray C moves. The point of the sheet contacts the guide fingers 109 shortly before said point reaches the longitudinal center of the winding rolls, and that is why Fig. 10 shows three fingers on one side of the center and only one finger on the other side of the center.

Bodily endwise movement of the sheet continues along the 45° line so that by the time the point of the sheet has reached the longitudinal center of the winding rolls, the fingers 109 will have guided the point of the sheet a substantial distance around the tray and the pellets contained therein, or in other words, to the point where the line S in Fig. 23 underlies the center line of the tray and pellets.

By this time, the point of the sheet will be overlapped by guide fingers 83ᵃ, which, as before stated, extend thence 180° around the pellets and to a point where they, in turn, are overlapped by fingers 112. After the wrapping starts, fingers 83ᵃ serve to guide the point of the sheet around the top of the pellets, the last guiding being done by the fixed fingers 112.

It may here be stated that in mounting the winding rolls 85, 86 and roller 60, due care is given to providing bearings which may be properly lubricated and suitably protected against the entry of fine black powder dust. However, these features are deemed to be merely matters of good engineering design and are not entered into in detail.

The pellets to be wrapped are inspected and placed by hand on the input belt A, the guide wall 27 being suitably adjusted for the size pellet being used. The belt A runs continuously and alternately moves the pellets ahead or slides under the pellets as the pusher B moves back and forth. The plate 24 acts as a drag to prevent the pellets from shifting too quickly toward the grid 25 or from running ahead of the pusher as the latter advances.

After four of the pellets have been deposited in the tray C, the tray is advanced by its slide until the pellets lie between the upper winding rolls 85 and 86 upon the one hand and the lower winding roller 60 upon the other hand. During the initial feeding-in movement of the paper around the tray and pellets as described, the straight bases 62ᵃ of the folders (Fig. 14) lie in a position to constitute what is, in effect, a continuation of the table 121, and these surfaces aid in guiding the paper over the gap between the table and the tray.

The timing of the parts is such that the fingers 61 then move in the direction of the arrow z in Fig. 14 to carry said fingers from the full line to the dotted line position in said Fig. 14. These fingers at the opposite ends of the pellet then move bodily toward each other under the influence of springs 68, this movement being permitted by the configuration of cams 69 as the turning movement of shaft 58 moves said cams over fixed rollers 70.

The tray C is then withdrawn from beneath the pellets, leaving them held by the spring actuated fingers 61. As indicated by the shade line upon the bottom of tray C in Fig. 14, there is such clearance between the underside of the tray and roller 60 that the paper may pass around the underside of the tray and partway around the pellets, as described, in its movement to bring the point indicated by line S in Fig. 23 centrally beneath the axis of the pellets.

After the withdrawal of the tray, rolls 85, 86 are brought into gripping engagement with the pellets, binding said pellets between themselves and roller 60 and accurately centering the pellets as hereinbefore described. The movement of shaft 58 is now in the opposite direction, and the fingers 61 are retracted from the dotted line to the full line position illustrated in Fig. 14. In this position, the fingers will clear the pellets and the top edges 62a of the folders will be flush with the paper line.

By referring to Fig. 4 it will be seen that the upward movement of rack 56 is under the influence of spring 55. This prevents breakage of the folders or damage to other parts when the folders operate. The actuating cam 15 then dwells, with the fingers retracted and the folders flush with the paper line, until the first 5" of the wind is completed, and the folding position (line T, Fig. 23) is reached.

Then cam 15 acts to swing the folders upwardly 60°, during which movement cam 69 rides on roller 70 and the folders are held in slightly retracted position against the tension of springs 68. Thus, during this movement the folders are free of the ends of the pellets and free of the straight edges 120. During this upward movement of the folders, the winding rolls dwell.

During the next 12° of movement of the cam 15, the folders swing up 30° further to their top limit, and during this 30° movement, the wrapping has been resumed by the action of the drums on rolls 85, 86. Also during this 30° movement, cam 69 rides off of roller 70 and permits the folders to fly in against the ends of the pellets and against the straight edges, it being understood that this upward movement of the folders will have folded the paper upwardly along the line of the straight edges and upwardly over the ends of the pellets.

The folders are of enough greater amplitude than the ends of the pellets to provide abutments which press firmly against the ends of the pellets and force the paper to be folded over in the form of pleats along the sides of the pellets, these pleats being enclosed within and concealed by the successive wrappings of the paper as it is wound about the pellets during continuation of the wrapping operation, the whole being finally secured by the dab of glue that is deposited upon the outer corner of the sheet.

An explosive package having a single thickness of paper folded over the end of solid explosive contents has been made the subject matter of a separate application, Serial No. 236,545, filed October 22, 1938, and the folders 62 of the machine of the present invention correspond to the abutment 17 shown in the aforesaid application.

At the completion of the action of the folders upon the paper, the folders swing down flush with the paper line where they dwell through 80° of the movement of the cam 15. During this time, the folders 62 and the fingers 61 lie in the full line position illustrated in Fig. 14, so that the tray C may move forward with a new supply of pellets. This forward movement of the tray ejects the finished cartridge or package and brings in the four new pellets.

A 20° further movement of the cam moves the fingers 61 to the dotted line position illustrated in Fig. 14 preparatory to gripping the newly positioned pellets. During this forward swinging movement of the fingers 61, a kicker bar 61b kicks the finished package laterally from between ribs i on plate I and the finished package rolls down the inclined plate I on to the take-off conveyor J. At PX in Fig. 11, a finished package is shown on its way out of the machine on the take-off conveyor.

A spring pressed abutment 229 is mounted in a bracket 230 and the end of the finished package is cushioned by this abutment as the package is thrust from between the winding rolls to lie between the ribs i on plate I until kicker bar 61b kicks the package from between said ribs and down the plate I on to the conveyor J.

The straight edges, of necessity, lie close to the line of the folders, and in order that the straight edge that is disposed toward the take-off side of the machine may not interfere with the ejectment of the finished package, the cam 126, upon the shaft of the roll 213 of the glue mechanism, acts at the proper moment to rock that straight edge inwardly against the tension of its spring 124 enough to move this straight edge out of the way of the ejected package.

While paper feed and paper cut-off mechanisms have been illustrated in the accompanying drawings in order to show a completely operative structure, I recognize the fact that mechanisms adapted to feed and cut off paper are well known in the paper handling and packaging arts. Many other arrangements for feeding and cutting the paper will readily suggest themselves to those skilled in this field, and many modifications may be resorted to without affecting the basically new principles involved in this invention.

As far as I am aware, I am the first to provide a machine which will bring a cylindrical object to be wound, or a group of cylindrical objects, and a sheet of paper or like wrapping material, together, fold the paper in such manner as to dispose only a single thickness of the same over the ends of the cylindrical object or objects, and then impart a turning or winding movement to the cylindrical objects while bringing about pressure between such objects and an abutment or folder, which prevents the surplus paper from folding outwardly and consequently forces it to fold inwardly along the sides of the cylindrical object, to be enclosed by succeeding turns of the paper.

It will be observed that the turning or winding movement imparted to the cylindrical objects is about a non-traveling or laterally fixed axis. By that I mean that the cylindrical objects are not rolled along a surface in the manner suggested in application Serial No. 236,545, filed October 22, 1938. This fact aids greatly in rendering it possible to carry out the several operations upon the package through the medium of the simple and compact mechanism shown.

The structure herein shown and described provides means for accomplishing this result automatically, at considerable speed, and in such fashion that the resultant package not only has the mechanical utility inherent in the single thickness end, as hereinbefore described, but is very neat and easily waterproofed, when immersed in a paraffin or like bath.

It is therefore to be understood that the invention is not limited to the particular mechanisms shown for accomplishing the several operations, but that it includes within its purview such modifications and rearrangements thereof as fairly come within either the terms or the spirit of the appended claims.

Having described my invention, what I claim is:

1. In a wrapping machine, a winding head for a web of wrapping material comprising a plurality of winding rolls, means for feeding material to be wrapped into position to be engaged and rotated by said rolls, and means for feeding a sheet of wrapping material to said rolls and the material to be wrapped at such an oblique angle as to present to the underside of said material a point representing a corner of the sheet, the shape of said sheet and the angle at which said sheet is presented to said rolls being such that said corner lies wholly within the length of the material being wrapped throughout all stages of the wrapping operation.

2. In a wrapping machine, a winding head for a web of wrapping material comprising a plurality of winding rolls, means for feeding material to be wrapped into position to be engaged and rotated by said rolls, and means for feeding a substantially square sheet of wrapping material to said rolls and the material to be wrapped at such an oblique angle as to present to the underside of said rolls and material a point representing a corner of the sheet, the angle at which said sheet is presented to said rolls being such that said corner lies wholly within the length of the material being wrapped throughout all stages of the wrapping operation.

3. In a wrapping machine, a winding head for a web of paper comprising a plurality of winding rolls, means for feeding a plurality of cylindrical objects disposed in end to end relation into position to be engaged and rotated by said rolls, means for feeding a web of paper to the winding head along a line oblique in such a plane as to present a point of the paper web to and beneath the cylindrical objects, guides for directing the point of paper to partially encircle the objects to be wrapped, and means for thereafter cutting off the paper web at such a point that the severed sheet will be substantially square, the angle at which said sheet is presented to said rolls being such that said corner lies wholly within the length of the material being wrapped throughout all stages of the wrapping operation.

4. A structure as recited in claim 3, in combination with means for varying the cut off point of the knife to accommodate cylindrical objects of varying diameters.

5. A structure as recited in claim 3, in combination with means for depositing a spot of adhesive upon the inner face of the severed sheet adjacent the rear point thereof.

6. In a wrapping machine, a winding head for a web of paper, said winding head comprising a plurality of winding rolls, means for feeding cylindrical material to be wrapped, into position to be engaged and rotated by said rolls, means for feeding a sheet of paper into said rolls and partly around the material to be wrapped at such an oblique angle as to present to said rolls a point representing a corner of the sheet, folders movable toward the ends of the material to be wrapped, means for actuating said folders after the wrapped material has made a partial rotation, to fold a single thickness of the paper over the ends of said material, and means for continuing the rotation of said rolls, to fold the paper sheet over in a plurality of pleats along the sides of the material being wrapped, the said folders being of such amplitude as to project beyond the periphery of the material being wrapped and to thereby prevent the outward folding of the paper.

7. A structure as recited in claim 6, in combination with means for depositing a spot of adhesive upon the inner face of the paper adjacent the rear point thereof.

8. A machine of the character described comprising a winding head consisting of a plurality of rotative elements adapted to receive and rotate a cylindrical object to be wrapped, a traveling carrier for supporting and carrying such a cylindrical object lengthwise between said rotative elements, means engaging the ends of the cylindrical object to support it while the carrier is withdrawn, means for thereafter bringing the rotative elements into engagement with the cylindrical object to center, support and rotate it, and means for feeding a substantially square sheet of paper with a corner point foremost, beneath and about said cylindrical object.

9. A machine of the character described comprising a winding head consisting of a plurality of rotative elements adapted to receive and rotate a cylindrical object to be wrapped, means for projecting such a cylindrical object lengthwise between said rotative elements, means engaging the ends of the cylindrical object to support it while the projecting means is withdrawn, means for thereafter bringing the rotative elements into engagement with the cylindrical object to center, support and rotate it, means for feeding a substantially square sheet of paper obliquely and point-foremost to and about said cylindrical sheet, folders of an amplitude materially greater than the ends of the cylindrical object, and means for moving the folders first across the ends of the cylindrical object to fold a single thickness of the paper over the ends of such object and for thereafter pressing the folders toward the ends of the cylindrical object, the movement of the folders being such that at the termination of their movement across the ends of the cylindrical object, they present portions lying outside of the circumference of said object, acting as said object is rotated, to force the folding of the paper in a plurality of pleats inwardly along the sides of said object.

10. In a machine of the character described, a winding head comprising a plurality of rollers spaced about a common axis, a carrier for projecting a plurality of cylindrical objects arranged end to end along said common axis and into position between said rollers, supporting members mounted to travel in arcuate paths around said axis and shaped to engage the ends of the cylindrical objects and temporarily hold them, means for retracting the carrier while the cylindrical objects are so held, means for feeding a web of wrapping material to the winding head at such a degree of obliquity as to present the point of said web to the said rollers, means for guiding the web partly around the cylindrical objects, means for moving the rollers toward and into gripping and centering relation to the cylindrical objects, and folders mounted to swing in an arcuate path and transversely of the common axis of the rollers, means for imparting such swinging movement to the folders, means tending to move said folders toward the ends of the cylindrical objects, the actuating means of said folders being so timed that the folders swing across the ends of the cylindrical objects to fold a single thickness of the wrapping material over said ends after said cylindrical objects have been given a partial revolution under the influence of said rollers, said folders being of such amplitude as to thereafter constitute abutments which force the folded portions of said sheets to fold over in the form of a plurality of pleats inwardly along the sides of the cylindrical objects.

11. In a machine of the character described, a winding head comprising a plurality of rollers spaced about a common axis, a carrier for bodily carrying a stack of cylindrical objects arranged end to end along said common axis and into position between said rollers, supporting members mounted to travel in arcuate paths around said axis and shaped to engage the ends of the cylindrical objects and temporarily hold them, means for feeding a sheet of wrapping material beneath said carrier and partly therearound, means for withdrawing the carrier while the cylindrical objects are still held by the supporting members, means for thereafter releasing the cylindrical objects from the supporting members to drop them upon the sheet of wrapping material, and means for thereafter effecting bodily movement of some of the rollers toward the others to bring about a gripping and centering action of the rollers upon the sheet of wrapping material and said cylindrical objects.

12. A structure as recited in claim 11 in combination with folders, means for moving said folders across the axis of the cylindrical objects and across the ends of said cylindrical objects to thereby fold a single thickness of the wrapping material over the ends of the cylindrical objects, and means for thereafter rotating said rollers to wind the sheet of wrapping material around the cylindrical objects.

13. A structure as recited in claim 11, in combination with folders, means for moving said folders across the axis of the cylindrical objects and across the ends of said cylindrical objects to thereby fold a single thickness of the wrapping material over the ends of the cylindrical objects, and means for thereafter rotating said rollers to wind the sheet of wrapping material around the cylindrical objects, said folders being of an amplitude sufficiently greater than the area of the ends of the cylindrical objects to present abutments which extend beyond the cylindrical objects and prevent the outward folding of the wrapping material as the rollers are turned, to thereby force the wrapping material to fold inwardly in the form of pleats along the sides of the cylindrical objects.

14. A structure as recited in claim 11, in combination with folders, springs tending to move the folders toward the cylindrical objects, means for moving said folders transversely of the axis of the cylindrical objects to thereby fold a single thickness of the wrapping material over the ends of the cylindrical objects, restraining means limiting the movement of the folders toward the cylindrical objects until the single thickness of material has been folded over the ends of such objects and for then releasing the folders to permit their springs to thrust them toward the ends of the cylindrical objects, and means for then bringing about a rotation of at least some of said rollers to wind the sheet of wrapping material around the cylindrical objects, said folders being of such amplitude as to present abutments which force portions of said sheets to be folded inwardly in the form of pleats along the sides of said cylindrical objects.

15. A structure as recited in claim 11, in combination with means for applying adhesive to that portion of the sheet of wrapping material last to be wound about the cylindrical objects.

16. A structure as recited in claim 11, in combination with a knife, means for actuating said knife to sever the sheet of wrapping material after its initial feeding movement about the carrier has been completed, and means for applying a dab of adhesive to that portion of the inner face of said sheet last to be wound about the cylindrical objects.

17. In a machine of the character described, a winding head comprising a plurality of rollers spaced about a common axis, a carrier for bodily carrying a plurality of cylindrical objects arranged end to end along said common axis and into position between said rollers, supporting members mounted to travel in arcuate paths around said axis and shaped to engage the ends of the cylindrical objects and temporaritly hold them, means for feeding a substantially rectangular sheet of wrapping material beneath said carrier and partly therearound, means for withdrawing the carrier while the cylindrical objects are still held by the supporting members, means for thereafter releasing the cylindrical objects from the supporting members to deposit them upon the sheet of wrapping material, means for thereafter effecting bodily movement of some of the rollers toward the others to bring about a gripping and centering action of the rollers upon the sheet of wrapping material and said cylindrical objects, a knife, means for actuating said knife to sever the wrapping material after the completion of its initial feeding movement around the carrier, and an adhesive applying element carried by the knife adapted to apply a dab of adhesive to the wrapping material as a part of the cutting off operation, the angle of presentation of said sheet being such that both its foremost and its rearmost points lie within the length of the package being formed throughout all stages of the wrapping operation.

18. A structure as recited in claim 17, wherein the wrapping material is initially in the form of an elongated web, a knife for cutting off the sheets of wrapping material from said web, an adhesive receptacle, and a mechanism mounted upon the knife and acting to transfer adhesive from the adhesive receptacle to the inner face of the sheet at that point of said sheet last to be wrapped about the cylindrical objects.

19. In a machine of the character described, a winding head comprising a plurality of rollers spaced about a common axis, means for mounting said rollers to permit them to have relative bodily movement toward and from each other, a reciprocatory carrier adapted to be projected longitudinally between said rollers when said rollers are separated, said carrier being shaped and dimensioned to receive a plurality of cylindrical pellets to be wrapped, means for feeding sheets of paper wrapping material to the winding head along such an oblique path as to cause a corner of said paper to be first presented to the winding head, guides for initially directing said point of paper beneath and partway around the pellets, supporting means adapted to engage the pellets and hold them against either endwise or vertical movement, means for then withdrawing the carrier, means for bringing about bodily relative movement of the rollers toward each other to effect a gripping and centering action of the rollers upon the pellets and the paper sheet, means for then releasing the supporting means to thereby deposit the pellets upon the paper sheet, folders, means for moving said folders in synchronism with the supporting means to project the folders across the ends of the pellets and to fold a single thickness of said sheet across said pellets, and means for thereafter effecting a turning movement of the rollers, the shape of the paper sheet and the angle of its presentation to the rollers being such that both the corner first presented to the rollers and its diagonally opposed corner, lie within the length of the group of pellets throughout the wrapping operation.

20. A structure as recited in claim 19, in combination with a knife disposed adjacent to the paper web, and means for actuating said knife to sever a sheet from said web, as and for the purposes set forth.

21. A structure as recited in claim 19, in combination with a knife disposed adjacent to the paper web, means for actuating said knife to sever a sheet from said web, and means for applying a dab of adhesive to that point of the sheet diagonally opposite the point first fed around the carrier.

22. A structure as recited in claim 19, in combination with a knife adjacent the paper web, means for actuating said knife to sever a sheet from said web, and means for adjusting the cutting off position of said knife to thereby vary the size of the sheet severed.

23. In the art of applying wrappings to a group of cylindrical objects placed together end to end, the combination with a winding head, of means for feeding webs of material of varying widths along an oblique path to said winding head to thereby present a corner of a web to the underside of said cylindrical objects, a knife disposed perpendicular to the line of travel of the web, means for actuating said knife to sever sheets from said web, and means for adjusting the position of the knife lengthwise of the web to thereby vary the size of the sheets cut off in accordance with the diameter of the objects being wound, the width of the web employed being determined by the combined length of the objects being wound, the shape of the sheets cut from such web and the degree of obliquity of the path of said web being such that the corner first presented to the winding head, and also the diagonally opposed corner of the sheet, both lie within the length of the group of cylindrical objects throughout the wrapping operation.

24. A structure as recited in claim 23, wherein said winding head comprises a plurality of winding rollers separable from each other to permit the endwise feeding therebetween of the objects to be wound, and means for effecting the movement of said rollers toward each other to grip the paper sheet and the objects to be wound after the forward point of the sheet has been fed a predetermined distance beneath and about said objects, the point at which such gripping takes place being the same for all diameters and all lengths of the completed packages.

25. In a machine of the character described, a winding head comprising a rotative supporting roller disposed beneath the winding axis and parallel therewith, a pair of winding rollers disposed above the winding axis and upon opposite sides of said axis, driving drums for driving the last-named winding rollers, an arm, at one end of which the said driving drums and upper winding rollers are mounted, said arm being pivoted for vertical swinging movement at its other end, the mounting of the upper winding rollers upon said arm being a yieldable one to thereby permit said rollers to seek a centering position upon cylindrical objects to be wound, means for effecting vertical movement of said arm about its pivot point, and driving means for driving through said pivot point to the driving drums.

26. A structure as recited in claim 25, wherein said driving means comprises a driven shaft, a cam thereon, a rack bar, means for actuating the rack bar from the cam, and means actuated by the rack bar for effecting turning movement of the driving drums of the winding head.

27. A winding head comprising a swinging arm pivoted at one end, a sprocket wheel concentric with said pivot point, a sprocket wheel mounted at the free end of said arm, a sprocket chain connecting said sprocket wheels, a shaft upon which the said last-named sprocket wheel is mounted, driving drums upon said shaft, winding rollers having a yieldable mounting at the free end of said arm and adapted to be engaged and driven by the driving drums when the arm descends, and means for raising and lowering said arm.

28. A winding head comprising a swinging arm pivoted at one end, a sprocket wheel concentric with said pivot point, a sprocket wheel mounted at the free end of said arm, a sprocket chain connecting said sprocket wheels, a shaft upon which the said last-named sprocket wheel is mounted, driving drums upon said shaft, winding rollers having a yieldable mounting at the free end of said arm and adapted to be engaged and driven by the driving drums when said arm descends, means for raising and lowering said arm, and means for varying the degree of throw of the vertical movement of said arm in accordance with the diameter of the article being wrapped.

29. A machine of the character described comprising a conveyor for carrying pellets disposed end to end, a pusher movable laterally of the line of the conveyor for pushing a determined number of said pellets from the conveyor, a trough-like carrier to receive the pellets projected by the pusher, means for effecting reciprocatory movement of said carrier, a winding head comprising a plurality of winding rollers, capable of rotation about their axes and also capable of bodily separation to permit the entry of said carrier therebetween, means for feeding a paper sheet to the winding rollers along such an oblique path as to present a point of the said sheet to said rollers, guides for guiding the point of the sheet partly around the carrier and the pellets held thereby, supporting means, means for moving the supporting means to cause them to grip the ends of the pellets and press them together and hold the pellets in elevated position while the carrier is being withdrawn in its reciprocatory movement and for then moving the supporting means to release the pellets anad deposit them upon the sheet.

30. A machine of the character described comprising a longitudinally moving conveyor for carrying pellets disposed end to end, a pusher movable laterally of the line of the conveyor for pushing a determined number of said pellets from the conveyor, a trough-like carrier to receive the pellets projected by the pusher, means for effecting reciprocatory movement of said carrier, a winding head comprising a plurality of winding rollers capable of rotation about their axes and also capable of bodily separation to permit the entry of said carrier therebetween, means for feeding a paper sheet to the winding rollers along such an oblique path as to present a point of the said sheet to said rollers, guides for guiding the point of the sheet partly around the carrier and the pellets held thereby, supporting means, means for moving the supporting means to cause them to grip the ends of the pellets and press them together and hold the pellets in elevated position while the carrier is being withdrawn in its reciprocatory movement and for then moving the supporting means to release the pellets and deposit them upon the sheet, driving drums for engaging the winding rollers to press said winding rollers upon the pellets and to bring about a rotation of the winding rollers to wind the sheet about the pellets, folders, moving in synchronism with the supporting means and projected across the ends of the pellets after the supporting means have been withdrawn, to thereby fold a single thickness of the sheet across the ends of the pellets, there being one of said folders at each end of the group of pellets, compensating means connecting said folders to cause them to move in unison, spring means tending to move the folders forcibly toward the pellets, restraining means restraining the action of the spring means until the folders have folded the single thickness of material across the ends of the pellets, means for then releasing the restraining means to permit the spring means to thrust the folders forcibly toward the group of pellets, said folders being of sufficiently greater area than the ends of the pellets to provide abutments which prevent the outward folding of the sheet as rotation of the winding rollers continues and to force said sheet to be folded inwardly in the form of pleats along the sides of the pellets.

31. A structure as recited in claim 30, in combination with a pair of straight-edges overlying the sheet being fed and over the edges of which said sheet is folded by the action of said folders.

32. A structure as recited in claim 30, in combination with a pair of straight-edges overlying the sheet being fed and over the edges of which said sheet is folded by the action of said folders, and spring means tending to move said straight-edges outwardly.

33. In combination, a winding head comprising a centrally disposed roller located beneath the winding axis, a pair of winding rollers located above and upon opposite sides of the axis, yieldable mountings for the last-named rollers, an oscillatory shaft concentric with the lower roller, collars splined on said shaft, and combined supporting members and folders carried by said collars and movable in arcuate paths to first project the supporting members across the winding axis to grip the ends of and support a group of pellets to be wrapped and to thereafter move in the opposite direction to project the folders across the ends of said pellets, to fold a sheet of paper thereover, as described.

34. A structure as recited in claim 33, in combination with springs engaging said collars and tending to move the folders and supporting members at one end of the pellets toward the folders and supporting members at the opposite end of the pellets.

35. A structure as recited in claim 33, in combination with springs engaging said collars and tending to move the folders and supporting members at one end of the pellets toward the folders and supporting members at the opposite end of the pellets, and cam means shaped to be operable in the oscillatory movement of the folders and supporting means to hold the folders and supporting means away from the ends of the pellets until they are properly aligned with said pellets, and to then permit the spring means to thrust the folders or supporting means toward the ends of said pellets.

36. In a machine of the character described, the combination with a winding head, of means for supporting an elongated paper web to be fed to said winding head, a knife disposed adjacent to the line of travel of said paper web, the line of travel of said web being oblique to the axis of the winding head to thereby present a point of the paper to the winding head substantially centrally of the length of the winding head, feed rollers for feeding the paper web past the knife, and means for effecting a variable throw of the feed mechanism to thereby vary the amount of paper fed past the knife at each operation, the amount of paper so fed being in such proportion to the width of the web being used that the sheet cut off will be a square sheet, the first presented point of the paper lying within the length of the articles wrapped, throughout the wrapping operation.

37. A structure as recited in claim 36, in combination with a pad for applying adhesive, mounted upon a face of the knife at such a point that the adhesive deposited by said pad will be at that point of the sheet diagonally opposite the point of the sheet that is presented to the winding head.

38. A structure as recited in claim 36, in combination with a swinging arm mounted upon a face of the knife, an adhesive pad carried by said arm, an oscillatory shaft by which the arm is carried, a vertical rack, a pinion carried by the oscillatory shaft with which the rack engages, means for actuating said rack to bring about a swinging movement of said arm, an adhesive carrying pad over which the arm is moved in its swinging movement, bodily movement of said knife in the cutting off operation causing said pad to deposit a dab of adhesive upon that part of the inner face of the sheet that is diagonally opposite to the point that is presented to the winding roller.

39. In a machine of the character described, a winding head comprising a plurality of winding rollers, some of which are mounted for lateral separation from the others, means for projecting cylindrical objects to be wound, endwise between said rollers, folders mounted to swing across the ends of said cylindrical objects, and means carried by said folders and projecting beyond the winding head at the far side thereof, adapted to engage and kick laterally a wound package which has been pushed beyond the winding position by the entry of a fresh supply of cylindrical objects to be wound.

40. In a machine of the character described, a winding head comprising a plurality of winding rollers, some of which are mounted for lateral separation from the others, means for projecting cylindrical objects to be wound, endwise between said rollers, folders mounted to swing across the ends of said cylindrical objects, means carried by said folders and projecting beyond the winding head at the far side thereof, adapted to engage and kick laterally a wound package which has been pushed beyond the winding position by the entry of a fresh supply of cylindrical objects to be wound, and a conveyor adjacent said kick-off position to receive the kicked-off, wound packages.

41. In a machine of the character described, a vertically movable knife, an adhesive supply member, an adhesive receiving pad, a swinging arm by which said pad is carried, said swinging arm being supported from the knife, means acting independently of the movement of the knife to impart swinging movement to said swinging arm and pad to move the pad over the adhesive supply member, said swinging arm and pad thereafter moving bodily with the knife in its cutting stroke to press said pad upon the paper to apply a dab of adhesive thereto.

42. In a machine of the character described, the combination with means for feeding a paper web, of a knife adjacent said web comprising a vertically movable knife frame and blade, an oscillatory shaft mounted upon the face of the knife frame, cam mechanism for imparting oscillatory movement to said shaft, an arm slidably mounted upon said shaft and provided with a foot, an adhesive applying pad carried by said foot, an adhesive supply roller, the oscillatory movement of the shaft acting to move said pad over the roller to apply adhesive thereto and to thereafter swing said pad back to such horizontal position that in the subsequent movement of the knife upon its cutting stroke, the adhesive will be applied to the paper web.

43. A structure as recited in claim 42 in combination with means for adjusting the arm lengthwise of the oscillatory shaft to accommodate paper webs of different sizes.

44. In a machine of the character described, the combination with a knife having a frame mounted for vertical reciprocatory movement, of means for feeding a paper web beneath said knife, a cam shaft extending lengthwise of the knife and lying thereover, cams upon said shaft acting to thrust the knife downwardly to sever the paper web, an additional cam upon said shaft, a rack bar actuated by the additional cam, an oscillatory shaft mounted upon the face of the knife frame, a toothed portion upon said shaft with which the rack meshes, a swinging arm splined upon said shaft, a pad, adapted to receive adhesive, located at the free end of said arm, an adhesive supplying roller, and means for supplying adhesive to said roller, said roller being located in such juxtaposition to the knife frame that swinging movement of the pad-carrying arm moves the pad over the adhesive supplying roller.

45. In a machine of the character described, the combination of means for feeding a paper web, a vertically reciprocatory knife in operative relation thereto, said knife comprising a knife frame, a blade-carrying member, and means for mounting said blade-carrying member for fore and aft adjustment with respect to the knife frame.

46. In a machine of the character described, a knife comprising an elongated head having guiding elements at its opposite ends and rollers at spaced points upon its top, a block extending longitudinally of said head, a blade mounted in said block, means for adjusting the block bodily fore and aft with respect to said head, and a pair of stripper bars, one upon each side of the blade, yieldingly mounted with respect to the block.

47. A structure as recited in claim 46, in combination with a bed plate having a plurality of slots for the reception of the blade and acting in conjunction with the blade to sever a sheet fed beneath the blade and over said plate.

48. A machine of the character described comprising a winding head consisting of a plurality of rotative elements adapted to receive and rotate a cylindrical object to be wrapped, a carrier for collecting and bodily carrying a stack of cylindrical objects lengthwise between said rotative elements, supporting means engaging the ends of the cylindrical objects to support the stack while the carrier is withdrawn, and means for thereafter bringing the rotative elements into engagement with the cylindrical objects to laterally center, support and rotate them.

49. A structure as recited in claim 48, in combination with means for effecting a bodily endwise shifting of the supporting means to thereby effect an endwise centering of the cylindrical object.

50. A machine of the character described comprising a winding head consisting of a plurality of rotative elements adapted to receive, and to rotate about a non-traveling axis, a group of cylindrical objects to be wrapped, means for projecting the group of cylindrical objects, disposed end to end, lengthwise between said rotative elements, supporting means engaging the ends of the cylindrical objects to complementally support them while the projecting means is withdrawn, means for effecting a yieldable bodily endwise shifting of the supporting means with the cylindrical objects to thereby effect an endwise centering of the whole group of cylindrical objects with respect to a sheet of wrapping material, means for feeding such a sheet of wrapping material to wrapping position with respect to said objects, and means for bringing the rotative elements into engagement with the cylindrical objects to laterally center, support and rotate them.

51. In a machine of the character described, a winding head comprising a bottom roller disposed below and in alignment with the winding axis, a pair of winding rollers disposed above and upon opposite sides of the winding axis, means for driving the last-named rollers, and means for loosely mounting said rollers to permit them to have bodily movement toward and from the first-named roller, the driving means for the last-named rollers comprising driving drums, and a member by which the driving drums and the last-named winding rollers are carried, and means for imparting movement to said member to first lift the driving drums out of engagement with the upper winding rollers and thereafter lift the upper winding rollers away from the lower roller.

DANIEL D. HUYETT.